(12) United States Patent
Won et al.

(10) Patent No.: US 11,044,358 B2
(45) Date of Patent: Jun. 22, 2021

(54) MOBILE TERMINAL AND METHOD FOR PROVIDING USER INTERFACE USING THE SAME, SERVER AND METHOD FOR PROVIDING MOBILE SERVICE USING THE SAME

(71) Applicant: NAVER Corporation, Seongnam-si (KR)

(72) Inventors: Sung Joon Won, Seongnam-si (KR); Seung Yeon Choi, Seongnam-si (KR); Yong Kee Hong, Seongnam-si (KR); Won Sik Sung, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 229 days.

(21) Appl. No.: 15/975,420

(22) Filed: May 9, 2018

(65) Prior Publication Data
US 2018/0367666 A1    Dec. 20, 2018

(30) Foreign Application Priority Data

Jun. 14, 2017 (KR) .................. 10-2017-0074899
Aug. 11, 2017 (KR) .................. 10-2017-0102289

(51) Int. Cl.
*G06F 3/048* (2013.01)
*H04M 1/72472* (2021.01)
(Continued)

(52) U.S. Cl.
CPC ...... *H04M 1/72472* (2021.01); *G06F 3/0488* (2013.01); *G06F 3/04817* (2013.01); *H04M 1/72403* (2021.01)

(58) Field of Classification Search
CPC ............ G06Q 10/109; G06Q 10/0631; G06Q 10/06311; H04M 1/72522;
(Continued)

(56) References Cited

U.S. PATENT DOCUMENTS 6,104,398 A  *  8/2000  Cox, Jr. ............. G06F 3/04847
                                                         715/821
2006/0069604 A1    3/2006  Leukart et al.
(Continued)

FOREIGN PATENT DOCUMENTS

KR    1020060105908 A    10/2006
KR       101130421 B1     3/2012
(Continued)

OTHER PUBLICATIONS

Korean office action dated Jul. 13, 2018 in corresponding Korean Patent Application N. KR10-2017-0102289.
(Continued)

*Primary Examiner* — Haoshian Shih
(74) *Attorney, Agent, or Firm* — Greer, Burns & Crain, Ltd.

(57) ABSTRACT

Disclosed is a method of operating a mobile terminal that is capable of interworking with a server, and the method includes: displaying a first user interface (UI) for managing a to-do list of a terminal user on a display unit; registering a task to be performed by the terminal user as a to-do item in the to-do list based on user information input through the first UI, and managing the plurality of to-do items registered in the to-do list; and when at least one of the plurality of to-do items is selected, performing an operation related to a task corresponding to the selected to-do item.

19 Claims, 57 Drawing Sheets

(51) Int. Cl.
 *G06F 3/0488* (2013.01)
 *G06F 3/0481* (2013.01)
 *H04M 1/72403* (2021.01)

(58) Field of Classification Search
 CPC .. H04M 1/72586; G06F 3/048; G06F 3/0488; G06F 3/04817
 See application file for complete search history.

(56) References Cited

U.S. PATENT DOCUMENTS

| | | | |
|---|---|---|---|
| 2006/0074844 A1 | 4/2006 | Frankel et al. | |
| 2006/0224433 A1 | 10/2006 | Baek et al. | |
| 2012/0311585 A1* | 12/2012 | Gruber | G06Q 10/109 718/100 |
| 2014/0173602 A1* | 6/2014 | Kikin-Gil | G06Q 10/109 718/100 |
| 2015/0286980 A1* | 10/2015 | Shusterman | G06Q 10/063114 705/7.15 |
| 2016/0034525 A1* | 2/2016 | Neels | G06F 16/285 707/737 |
| 2017/0061393 A1* | 3/2017 | Park | G06F 40/279 |

FOREIGN PATENT DOCUMENTS

| | | |
|---|---|---|
| KR | 101150013 B1 | 5/2012 |
| KR | 1020130085846 A | 7/2013 |
| KR | 101433147 B1 | 8/2014 |
| KR | 101736868 B1 | 5/2017 |
| KR | 101739794 B1 | 5/2017 |

OTHER PUBLICATIONS

Korean office action dated Oct. 2, 2018 in corresponding Korean Patent Application No. KR10-2017-0074899.

* cited by examiner

| | 📶 31% 7:00 P.M. |
|---|---|
| ✱ ALL | ☰ |
| 821 — BUY PANTS | ○ |
| BEAUTY AND BEAST | ○ |
| RESERVE 2017 SEOUL MOTOR SHOW | ○ |
| RESERVE SEOUL MOTOR SHOW | ○ |
| BLUE DOT WILL APPEAR ON TASKS | |
| BUY TURTLENECK | ○ |
| READ DESIGN OF DESIGN | ○ |
| RESERVE LOGAN | ○ |
| RESERVE MESSAGE IN BUNDANG | ○ |
| ADD TO-DO | ⊕ |

| ALL |

824 — MEN PANTS

BEAUTY AND BEAST

RESERVE 2017 SEOUL MOTOR SHOW

RESERVE SEOUL MOTOR SHOW

BLUE DOT WILL APPEAR ON TASKS

BUY TURTLENECK

READ DESIGN OF DESIGN

RESERVE LOGAN

RESERVE MESSAGE IN BUNDANG

ADD TO-DO ⊕

MOBILE TERMINAL AND METHOD FOR PROVIDING USER INTERFACE USING THE SAME, SERVER AND METHOD FOR PROVIDING MOBILE SERVICE USING THE SAME

CROSS-REFERENCE TO RELATED APPLICATIONS

This application claims priorities to Korean Patent Application No. 10-2017-0074899 filed on Jun. 14, 2017 and Korean Patent Application No. 10-2017-0102289 filed on Aug. 11, 2017 in the Korean Intellectual Property Office, the entire contents of which are hereby incorporated by reference in their entirety.

BACKGROUND OF THE INVENTION

Field of Invention

The present invention relates to a mobile terminal and a method of providing a user interface by using the same, and a server and a method of providing a mobile service by using the same. More particularly, the present invention relates to a method and an apparatus for providing a user interface which are capable of intelligently managing task items to be performed a user of a terminal by interworking a server and a mobile terminal.

Description of Related Art

A terminal may be divided into a mobile/portable terminal and a stationary terminal according to portability. The mobile terminal may be divided into a handheld terminal and a vehicle mounted terminal according to whether a user can carry the mobile terminal himself/herself.

A function of the mobile terminal has been diversified. For example, the function of the mobile terminal includes functions of data and voice communication, picture and video photographing by using a camera, voice recording, music file reproduction by a speaker system, and outputting an image or a video on a display unit. Some of the terminals include an additional electronic game play function to perform a multimedia player function. The mobile terminal may also receive a multicast signal providing visual contents, such as a broadcast or a video or a television program.

According to the diversification of the function of the mobile terminal, the mobile terminal has been constructed in the form of a multimedia player having complex functions, such as photographing a picture or a video, reproduction of a music or video file, games, and receiving a broadcast.

In addition to the foregoing functions, the mobile terminal provides additional service functions for managing event information, such as a schedule, a memo, and a task of terminal users. The additional service functions may be autonomously provided by the mobile terminal, or may be implemented by an application downloaded from an external server.

A to-do function of managing tasks among the additional service functions includes helping a terminal user not to miss a thing-to-memorize in a busy day when the terminal user registers tasks to be performed in the future in a to-do list in advance.

However, the to-do function in the related art simply provides only a reminder function of calling attention of a terminal user, but does not provide a function of supporting the terminal user to substantially perform (or complete) a corresponding task. Accordingly, it is necessary to provide a new mobile service which supports items registered in a to-do list to be fulfilled by a terminal user when the to-do function is used.

BRIEF SUMMARY OF THE INVENTION

An object of the present invention is to solve the foregoing problems and other problems. Another object is to provide a mobile terminal, and a server and an operating method thereof, which provide a user interface for simply registering tasks or future activities of a terminal user in a to-do list and intelligently managing a plurality of items registered in the to-do list.

Another object is to provide a mobile terminal, and a server and an operating method thereof, which support items registered in a to-do list to be substantially fulfilled by a terminal user.

Another object is to provide a mobile terminal, and a server and an operating method thereof, which predict and provide a repeated, task of a terminal user based on log, information on to-do items registered by the terminal user.

An exemplary embodiment of the present invention provides a method of operating a mobile terminal, the method including: displaying a first user interface (UI) for managing a to-do list of a terminal user on a display unit; registering a to-do (i.e., a task to be performed) of the terminal user in the to-do list based on user information input through the first UI, and managing a plurality of to-do items registered in the to-do list; and when at least one of the plurality of to-do items is selected, performing an operation related to a task corresponding to the selected to-do item.

Another exemplary embodiment of the present invention provides a mobile terminal including: a display unit; a wireless communication unit configured to provide a wireless communication interface; and a control unit configured to display a first user interface (UI) for managing a to-do list of a terminal user on the display unit, register a to-do of the terminal user as a to-do item in the to-do list based on user information input through the first manage a plurality of to-do items registered in the to-do list, and when at least one of the plurality of to-do items is selected, perform an operation related to a task corresponding to the selected to-do item.

Still another exemplary embodiment of the present invention provides a method of operating a server, the method including: transmitting information regarding a first user interface (UI) for managing a to-do list of a terminal user to a mobile terminal; receiving user information input through the first UI from the mobile terminal; registering a to-do of the terminal user as a to-do item in a to-do list based on the received input information, and managing a plurality of to-do items registered in the to-do list; and when at least one of the plurality of to-do items is selected, providing a mobile service related to a task corresponding to the selected to-do item to the mobile terminal.

BRIEF DESCRIPTION OF THE DRAWINGS

FIGS. 8A-8C and 9A-9C are diagrams referred for describing an operation of the mobile terminal which registers a new to-do in a to-do list.

DETAILED DESCRIPTION OF THE INVENTION

Figure 1:
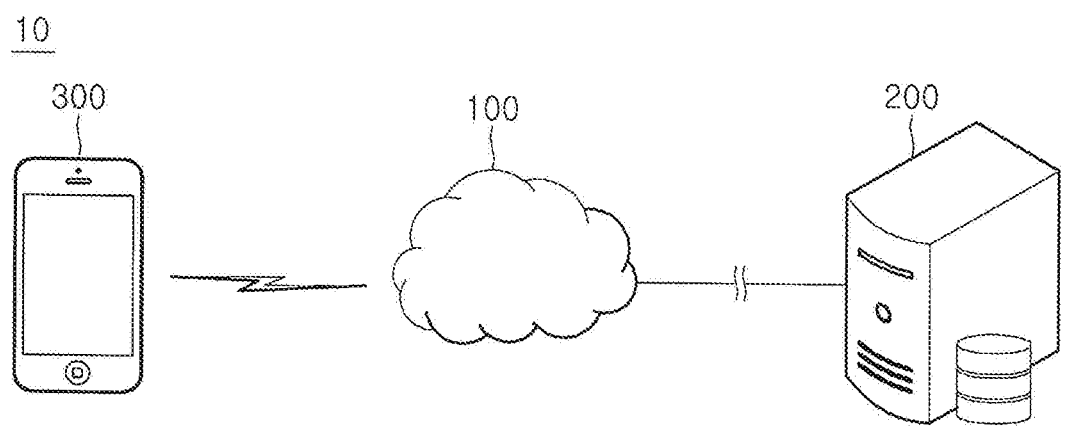
FIG. 1 is a diagram illustrating a configuration of a mobile service providing system according to an exemplary embodiment of the present invention.

Hereinafter, exemplary embodiments disclosed in the present specification will be described in detail with reference to the accompanying drawings, and the same or similar constituent elements are denoted by the same reference numerals throughout the drawing, and repeated description thereof be omitted. Suffixes "module" and "unit" for constituent elements used in the description below are given or used together in consideration of only easiness of drafting the specification, and the suffixes "module" and "unit" themselves do not mean a discrimination therebetween or serve to discriminate from each other. That is, a term "~unit" used in the present invention means a hardware constituent element, such as software, a field programmable gate array (FPGA) or an application specific integrated circuit (ASIC), and the "~unit" performs specific functions. However, the "~unit" does not have meaning limited to software or hardware. The "~unit" may be configured to be present in an addressable storage medium or may also be configured to reproduce one or more processors. Accordingly, as an example, the "~unit" includes constituent elements, such as software constituent elements, object-oriented software constituent elements, class constituent elements, and task constituent elements, and processes, functions, attributes, procedures, sub-routines, segments of a program code, drivers, firmware, a micro code, a circuit, data, a database, data structures, tables, arrays, and variables. Functions provided within the constituent elements and the "~units" may be combined with the smaller number of constituent elements and "~units", or may be further separated to additional constituent elements and "~units".

In describing the exemplary embodiments disclosed in the present specification, a detailed explanation of known related technology may be omitted so as to avoid unnecessarily obscuring the subject matter of the exemplary embodiments disclosed in the present specification. Further, the accompanying drawings are provided for helping easy understanding of the exemplary embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

The present invention suggests a method of providing a user interface (UI) which is capable of intelligently managing a to-do of a terminal user by interworking a service providing server and a mobile terminal.

Hereinafter, various exemplary embodiments of the present invention will be described in detail with reference to the drawings.

FIG. 1 is a diagram illustrating a configuration of a mobile service providing system according to an exemplary embodiment of the present invention.

Referring to FIG. 1, the mobile service providing system 10 according to the present invention may include a communication network 100, a server 200, a mobile terminal 300, and the like.

The mobile terminal 300 and the server 200 may be connected with each other through the communication network 100. The communication network 100 may include a wired network and a wireless network, and particularly, the communication network 100 may include various networks, such as a local area network (LAN), a metropolitan area network (MAN), and a wide area network (WAN). Further, the communication network 100 may also include a publicly known world wide web (WWW). However, the communication network 100 according to the present invention is not limited to the listed networks, and may also include at least one of a publicly known wireless data network, a publicly known telephone network, and a publicly known wired/wireless television network.

The mobile terminal 300 may provide a mobile service based on information received from the server 200. For example, when the server 300 is a web server, the mobile terminal 300 may provide a web service based on contents received from the server 200.

The mobile terminal 300 may download and install an application (hereinafter, for convenience of the description, referred to as a "to-do application") which provides a UI for managing a to-do list and supporting a mobile service related to to-do items registered in the corresponding list. In this case, the mobile terminal 300 may download the corresponding application by accessing the App Store or the Play Store, or may download the corresponding application through a separate storage medium. Further, the mobile terminal 300 may also download the corresponding application through wired/wireless communication with the server 200 or another device.

The mobile terminal 300 may execute a pre-installed to-do application in response to a predetermined user input. When the corresponding application is executed, the mobile terminal 300 may display a predefined UI on a display unit 320 (shown in FIG. 3). When information about a to-do of the terminal user is input through the UI the mobile terminal 300 may register a new item in the to-do list based on the input information and intelligently manage the to-do list in which the new item is registered.

The mobile terminal 300 may provide a mobile service related to a task corresponding to the corresponding item so that the items registered in the to-do list may be substantially fulfilled by the terminal user. Further, the mobile terminal 300 may provide a mobile service related to a "to-do clean-up function" so that the plurality of items registered in the to-do list may be conveniently organized.

The mobile terminal 300 described in the present specification may include a mobile phone, a smart phone, a notebook computer (laptop computer), a digital broadcasting terminal, personal digital assistants (PDA), a portable multimedia player (PMP), a navigation device, a slate personal computer (PC), a tablet PC, an ultrabook, a wearable device, for example, a watch-type terminal (smart watch), a glass type terminal (smart glass), and a head mounted display (HMD), and the like.

The server 200 is a service providing server (or a service provider), and may perform a function of providing a mobile service requested by the mobile terminal 300. For example, when the server 200 is a web server, the server 200 may configure the contents requested by the mobile terminal 300 in the form of a web page and provide the contents to the corresponding terminal 300.

The server 200 may provide information about the UI for managing the to-do lists of the terminal users and supporting the mobile service related to the to-do items registered in the corresponding lists to the mobile terminal 300.

The server 200 may register and manage the to-do items of the terminal users based on the user input, information received from the mobile terminals 300, and provide information about various mobile services related to the to-do items selected by the terminal users to the mobile terminals 300. Further, the server 200 may provide information about a mobile service related to a "to-do clean-up function" requested by the terminal users to the mobile terminals 300.

Figure 2:
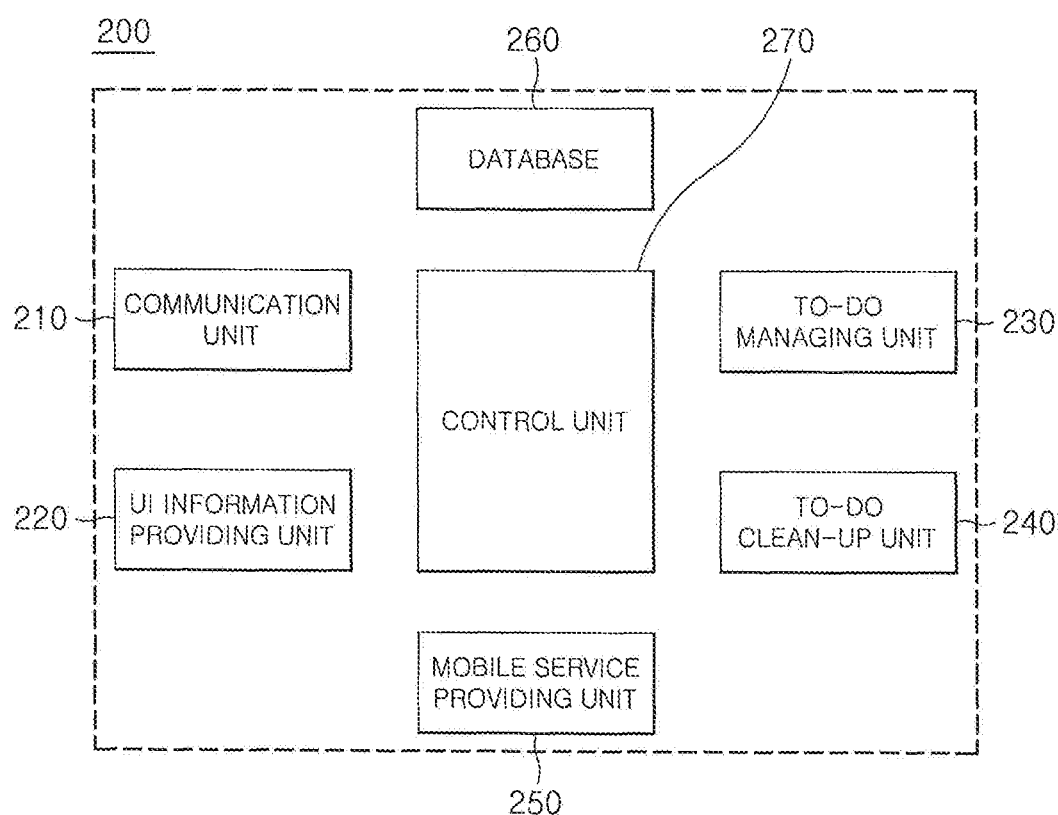
FIG. 2 is a block diagram illustrating a configuration of a server in the mobile service providing system of FIG. 1 according to the exemplary embodiment of the present invention.

FIG. 2 is a block diagram illustrating a configuration of the server 200 according to an exemplary embodiment of the present invention.

Referring to FIG. 2, the server 200 includes a communication unit 210, a UI information providing unit 220, a to-do managing unit 230, a to-do clean-up unit 240, a mobile service providing unit 250, a database 260, a control unit 270, and the like. The server 200 described in the present specification may include more or less constituent elements than the constituent elements listed above.

The communication unit 210 may include a wired communication module for supporting wired communication and a wireless communication module for supporting wireless communication. The wired communication module transceives a wired signal with at least one of another server, a base station, and an access point (AP) in a wired communication network established according to technology standards or a communication scheme (for example, Ethernet, power line communication (PLC), home phoneline networking alliance (PNA), and Institute of Electrical and Electronics Engineers (IEEE) 1394) for the wired communication.

The wireless communication module transceives a wireless signal with at least one of a base station, an AP, and a repeater in a wireless communication network established according to technology standards or a communication scheme (for example, a wireless local area network (LAN), wireless fidelity (Wi-Fi), digital living network alliance (DLNA), a global system for mobile communication (GSM), code division multi access (CDMA), a wideband CDMA (WCDMA), long term evolution (LTE), LTE-Advanced (LTE-A)) for the wireless communication.

In the present exemplary embodiment, the communication unit 210 performs a function of transmitting information about the UI and information about the mobile service provided to the mobile terminal 300 to the corresponding terminal 300. Further, the communication unit 210 may perform a function of receiving user input information transmitted from the mobile terminal 300 or the information about the mobile service requested by the mobile terminal 300.

The UI information providing unit 220 performs a function of generating information (that is, screen configuring information) about the UI for managing the to-do lists of the terminal users and supporting the mobile services related to the to-do items registered in the corresponding list and providing the generated information to the communication unit 210. Herein, the screen configuring information may include information about a structure and disposition of graphic objects configuring the UI, and information about items and contents included in the UI, and the like. Further, the screen configuring information may be generated with a UI command, and the UI command many be a web script made by various web languages, such as hypertext markup language (HTML), cascading style sheets (CSS), Java script, and extensible markup language (XML).

The to-do managing unit 230 performs a function of registering the to-do items of the terminal users in the to-do lists, based on the user input information received from the mobile terminals 300, and managing the plurality of to-do items registered in the to-do lists, respectively.

The to-do clean-up unit 240 performs a function of organizing the plurality of items registered in the to-do lists of the terminal users based on the user input information received from the mobile terminals 300.

The user input information received from the mobile terminals 300 may be text information input through the UI of the mobile terminal 300 or menu information selected in the UI, but is not essentially limited thereto.

The mobile service providing unit 250 performs a function of generating information about a mobile service related to the execution of the items registered in the to-do lists of the terminal users and providing the generated information to the communication unit 210. That is, the mobile service providing unit 250 generates information about an operation, a function, an app service, and the like required for performing tasks corresponding to the to-do items of the terminal users and provide the generated information to the communication unit 210. Further, the mobile service providing unit 250 generates information about one or more operation option menu items related to the tasks corresponding to the to-do items of the terminal users and provide the generated information to the communication unit 210.

The mobile service providing unit 250 performs a function of generating information about a mobile service related to the organization of the items registered in the to-do lists of the terminal users and providing, the generated information to the communication unit 210. That is, the mobile service providing unit 250 generates information about an operation, a function, an app service, and the like required for organizing the items registered in the to-do lists of the terminal users and provide the generated information to the communication unit 210.

The database 260 performs a function of storing information (or data) received from the mobile terminal 300 or another server (not illustrated), information (or data) autonomously generated by the server 200, information (or data) to be provided to the mobile terminal 300 or another server, and the like.

The database 260 also stores log information (or a log record) about all of the to-do items registered in the to-do lists of the terminal users or deleted from the corresponding list. The log information may be used for predicting tasks (or to-dos) which the terminal users periodically fulfill.

The control unit 270 controls a general operation of the server 200. Further, the control unit 270 may combine at least one of the foregoing constituent elements and control the combination in order to implement various exemplary embodiments to be described below in the server 200 according to the present invention 200.

In the present exemplary embodiment, the control unit 270 performs a general operation of managing the to-do lists of the terminal users and providing a mobile service related to the fulfillment of the plurality of items registered in the to-do lists, respectively. Further, the control unit 270 performs a general operation for providing a mobile service related to the organization of the plurality of items registered in the to-do lists of the terminal users.

Figure 3:
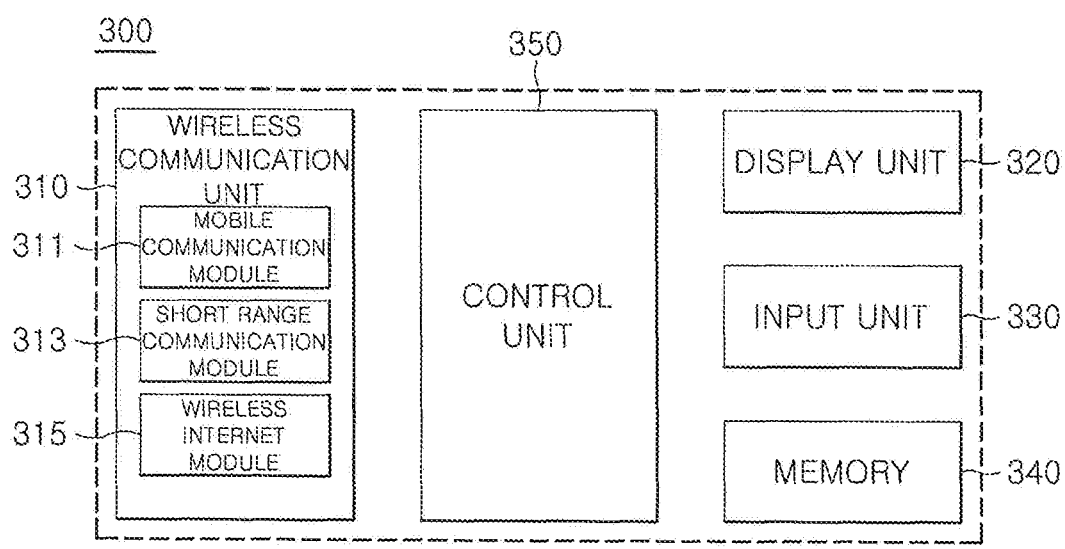
FIG. 3 is a block diagram illustrating a configuration of a mobile terminal in the mobile service providing system of FIG. 1 according to the exemplary embodiment of the present invention.

FIG. 3 is a block diagram for describing a configuration of the mobile terminal 300 according to an exemplary embodiment of the present invention.

Referring to FIG. 3, the mobile terminal 300 includes a wireless communication unit 310, a display unit 320, an input unit 330, a memory 340, a control unit 350, and the like. The mobile terminal 300 described in the present specification may include more or less constituent elements than the constituent elements listed above.

The wireless communication unit 310 includes a mobile communication module 311, a short range communication module 313, a wireless Internet module 315, and the like. The mobile terminal 300 may exchange data related to a "to-do application" with the server 200 via the wireless communication unit 310.

The mobile communication module 311 transceiver a wireless signal with a neighboring base station in the mobile communication network established according to technology standards or a communication scheme (for example, GSM, CDMA, CDMA 200, enhanced voice-data optimized or enhanced voice-data only (EV-DO), WCDMA, high speed downlink packet access (HSPDA), high speed uplink packet access (HSUPA), LTE, and LTE-A)) for the mobile communication.

The short range communication module 313 is for short range communication, and may support short range communication by using at least one of Bluetooth™, radio frequency identification (RFID), infrared data association (IrDA), ultra wideband (UWB), ZigBee, near field communication (NFC), Wi-Fi, Wi-Fi direct, wireless universal serial bus (USB) technologies.

The wireless Internet module 315 is a module for wireless Internet access and is configured to transceive a wireless signal in a communication network according to wireless Internet technologies. The wireless Internet technology includes, for example, WLAN, Wi-Fi direct, DLNA, wireless broadband (WiBro), and world interoperability for microwave access (WiMAX), and the wireless Internet module 315 transceives data according to at least one wireless Internet technology in the range including Internet technologies which are not listed above.

The display unit 320 displays (outputs) information processed in the mobile terminal 300. For example, the display unit 320 may display execution screen information about an application program driven in the mobile terminal 300 or UI information or graphic user interface (GUI) information according to the execution screen information.

The display unit 320 may have a mutual layer structure with a touch sensor or may be integrally formed with the touch sensor to fabricate a touch screen. The touch screen serves as a user input unit providing an input interface between the mobile terminal 300 and the user, and may simultaneously provide an output interface between the mobile terminal 300 and the user.

The input unit 330 may include a camera or an image input unit for inputting an image signal, a microphone or an audio input unit for inputting an audio signal, a user input unit (for example, a touch key and a push key (a mechanical key)) for receiving information from the user. The data obtained from the input unit 330 may be analyzed and processed as a control command of the terminal user.

The memory 340 stores data supporting various functions of the mobile terminal 300. The memory 340 may store a plurality of application programs (or applications) driven in the mobile terminal 300, and data and commands for an operation of the mobile terminal 300.

In the present exemplary embodiment, the memory 340 may store an application providing the UI for managing the to-do list of the terminal user and supporting the mobile services related to the items registered in the corresponding list, and the like.

The memory 340 may include at least one type of storage medium among a flash memory type, a hard disk type, a solid state disk (SSD) type, a silicon disk drive (SDD) type, a multimedia card micro type, a card type memory (for example, an secure digital (SD) or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The control unit 350 controls an operation related to the application program stored in the memory 340 and the general operation of the mobile terminal 300 in general. Further, the control unit 350 may combine at least one of the foregoing constituent elements and control the combination in order to implement various exemplary embodiments to be described below in the mobile terminal 300 according to the present invention.

In the present exemplary embodiment, the control unit 350 drives the "to-do application" stored in the memory 340 and display a predefined UI on the display unit 320 according to a user command. In response to the user input through the UI, the control unit 350 may perform a function of registering a new to-do of the terminal user in the to-do list, and managing the plurality of items registered in the to-do list. When at least one of the to-do items displayed in the UI is selected, the control unit 350 may provide a mobile service related to a task corresponding to the corresponding items so that the selected item is substantially fulfilled by the terminal user.

The control unit 350 may perform a function of organizing at least one of the plurality of items registered in the to-do list in response to the user input received from the predefined UI.

Figure 4:
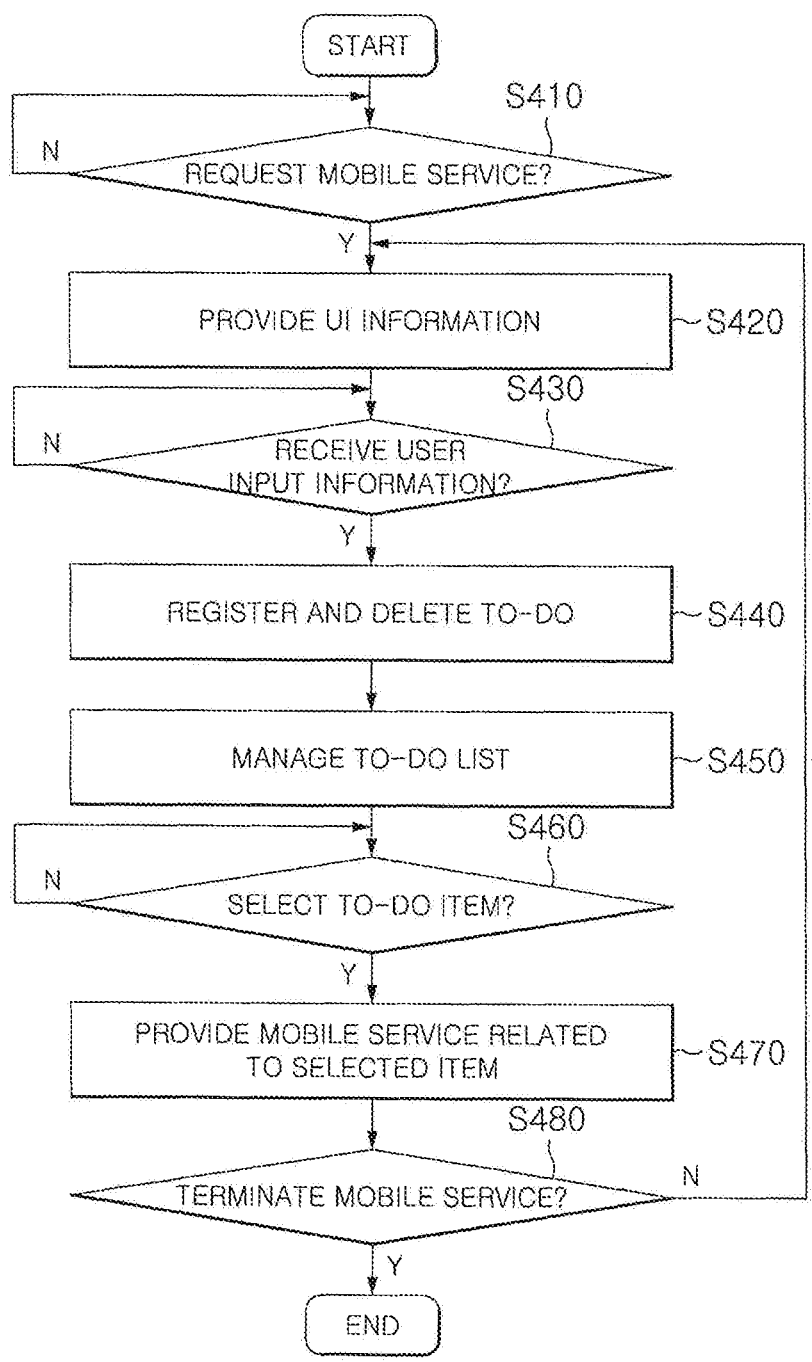
FIG. 4 is a flowchart describing an operation of the server of FIG. 2 according to the exemplary embodiment of the present invention.

FIG. 4 is a flowchart describing an operation of the server 200 according to an exemplary embodiment of the present invention.

Referring to FIG. 4, the control unit 270 may determine whether a signal requesting a specific mobile service (for example, a to-do service) is received from the mobile terminal 300 (S410). The signal requesting the mobile service may include information on the kind of mobile service, identification information of the mobile terminal 300, and the like.

As a result of the determination in operation S410, when the signal requesting the mobile service is received from the mobile terminal 300, the control unit 270 may generate information about a predetermined UI and transmit the generated information to the mobile terminal 300 (S420). Herein, the information about the predetermined UI may be information about the UI for managing to-do lists of the terminal users and supporting mobile services related to to-do items registered in the corresponding lists.

The control unit 270 may determine whether information (that is, user input information) input through the UI displayed in the mobile terminal 300 is received from the corresponding terminal 300 (S430). The user input information may be text information input through the UI or menu information selected in the but is not limited thereto.

The control unit 270 may register a new to-do item in the to-do list or delete at least one of the plurality of items registered in the to-do list based on the user input information received from the mobile terminal 300 (S440).

The control unit 270 may intelligently manage the plurality of items registered in the to-do list for each terminal user (S450). For example, the control unit 270 may classify the corresponding items into the predetermined number of categories (for example, call, text message, remittance, path finding, movie, read, reservation, buy, investigation, and the like) according to attributes and/or kinds of the items registered in the to-do list, and manage the classified items.

The control unit 270 may provide a function of organizing the plurality of items registered in the to-do list according to the requests of the terminal users. Further, the control unit 270 may provide a function of periodically analyzing the plurality of items registered in the to-do list and reminding the terminal user of the corresponding items.

When at least one item is selected from the to-do list displayed in the mobile terminal 300 (S460), the control unit 270 may provide a mobile service related to a task corresponding to the selected items (S470).

For example, the control unit 270 may generate information about an operation, a function, an app service, or the like required for fulfilling the task corresponding to the item selected by the terminal user and provide the generated information to the mobile terminal 300. Further, the control unit 270 may generate information about operation option menu items required for fulfilling the task corresponding to the item selected by the terminal user and provide the generated information to the mobile terminal 300.

As another exemplary embodiment, the control unit 270 may provide different mobile services to the mobile terminal 300 according to the kind of category to which the to-do item selected by the terminal user belongs.

The control unit 270 may repeatedly perform foregoing operations S420 to S470 until a signal indicating a termination of the corresponding mobile service is received from the mobile terminal 300 (S480).

Figure 5:
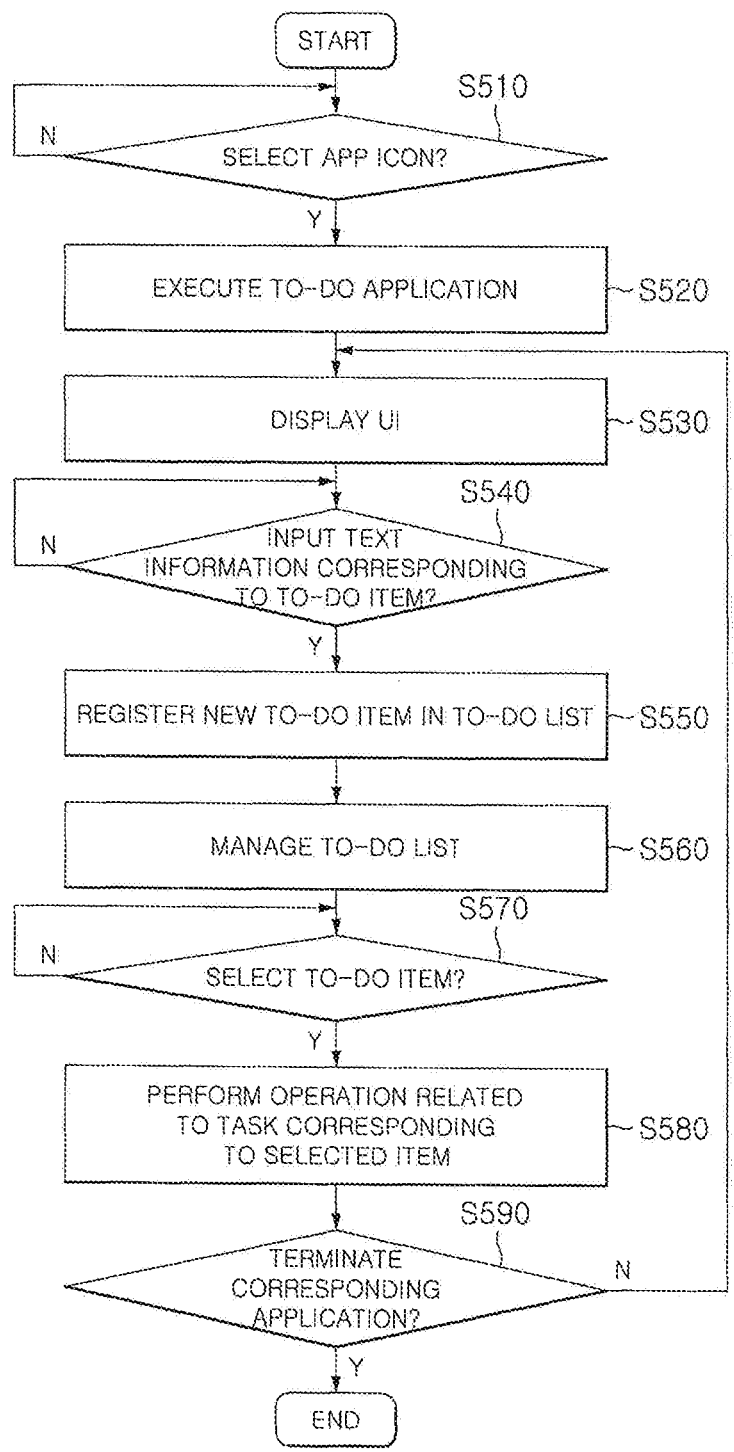
FIG. 5 is a flowchart describing an operation of the mobile terminal of FIG. 3 according to the exemplary embodiment of the present invention.

FIG. 5 is a flowchart describing an operation of the mobile terminal 300 according to an exemplary embodiment of the present invention.

Referring to FIG. 5, the control unit 350 may display a home screen or a menu screen on the display unit 320 according to a user command. In this case, the home screen or the menu screen may include app icons and/or Widgets corresponding to the plurality of applications installed m the mobile terminal 300. Further, it is assumed that the home screen or the menu screen includes an app icon (for example, a Do icon (See FIG. 7A)) corresponding to the "to-do application".

When the "Do icon" displayed on the home screen or the menu screen is selected (S510), the control unit 350 may execute the to-do application corresponding to the selected app icon (S520).

Figure 6:
FIG. 6 is a diagram describing a configuration of a user interface according to the exemplary embodiment of the present invention.

When the corresponding application is executed, the control unit 350 may display a predefined UI on the display unit 320 (S530). For example, as illustrated in FIG. 6, the UI 600 displayed on the display unit 320 may include a state bar region 610 displaying an operation state of the mobile terminal 300, a menu region 620 displaying operation menu items related to a currently executed application, a task list region 630 displaying a to-do list of the terminal user, a text input region 640 for registering, a new to-do item in the to-do list, and the like.

As another exemplary embodiment, the control unit 350 may display the UI in the form off pop-up window on the currently operating screen in response to a predetermined user input without the need for selecting a separate Do icon. In this case, the pop-up window may be displayed in an i-frame scheme. Further, as another exemplary embodiment, the control unit 350 may also display the UI in the form of an overlay on the currently operating screen in response to a predetermined user input.

The control unit 350 may determine whether text information indicating a to-do which the terminal user desires to newly register is input through the UI (S540).

As a result of the determination in operation S540, when the predetermined text information is input through the UI, the control unit 350 may newly register the to-do item corresponding to the input text information in the to-do list (S550). The control unit 350 may delete or edit at least one of the plurality of items registered in the to-do list according to a user command.

The control unit 350 may intelligently manage the plurality of items registered in the to-do list of the terminal user (S560). For example, the control unit 350 may classify the corresponding items into the predetermined number of categories (for example, call, text message, remittance, path finding, movie, read, reservation, buy, investigation, and the like) according to attributes and/or kinds of the items registered in the to-do list, and manage the classified items.

The control unit 350 may provide a function of organizing the plurality of items registered in the to-do list according to the request of the terminal user. Further, the control unit 350 may provide a function of periodically analyzing the plurality of items registered in the to-do list and reminding the terminal user of the corresponding items.

As another exemplary embodiment, the control unit 350 may intelligently manage the plurality of item registered in the to-do list of the terminal user by interworking with the server 200 when the to-do application is executed.

When at least one item is selected from the to-do list displayed in the UI (S570), the control unit 350 may perform an operation related to a task corresponding to the selected item (S580).

For example, the control unit 350 may immediately execute an operation, a function, or an app service required for fulfilling a task corresponding to the to-do item selected by the terminal user. Further, the control unit 350 may display one or more operation option menu items required for performing the task corresponding to the to-do item selected by the terminal user in the UI.

The operation option menu items provided through the UI may be operation option menu items corresponding to the function or the app service installed in the mobile terminal 300. Further, the operation option menu items may correspond to a function or an app service which is not installed in the mobile terminal 300. In the latter case, the control unit 350 may perform an operation related to the task corresponding to the item selected by the terminal user based on the information received from the server 200.

The control unit 350 may repeatedly perform operations S530 to S580 until the currently executed application is terminated according to a user command (S590).

As described above, the mobile terminal 300 and the server 200 according to the exemplary embodiment of the present invention may register a to-do of a terminal user in a to-do list based on user information input through a predefined UI and provide a mobile service related to the corresponding item so that the items registered in the to-do list may be substantially fulfilled by the terminal user, thereby providing user convenience that is differentiated from that of the app service in the related art.

Hereinafter, operations of the mobile terminal 300 which is capable of effectively managing a to-do of the terminal user by using the UI according to the present invention will be described in detail with reference to FIGS. 7A to 17.

Figure 7A:
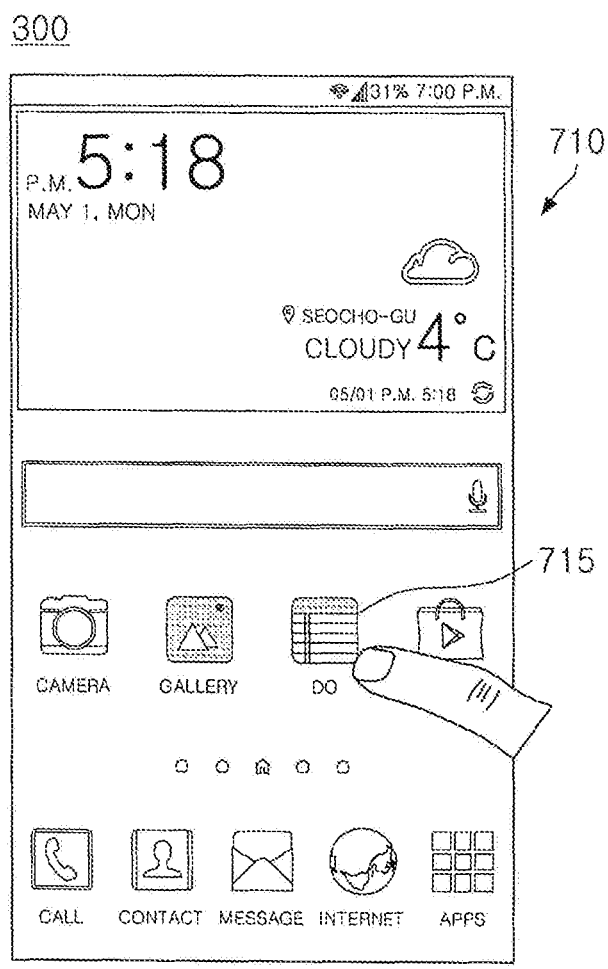
FIGS. 7A and 7B are diagrams referred for describing an operation of the mobile terminal which displays the user interface according to the exemplary embodiment of the present invention.
Figure 7B:
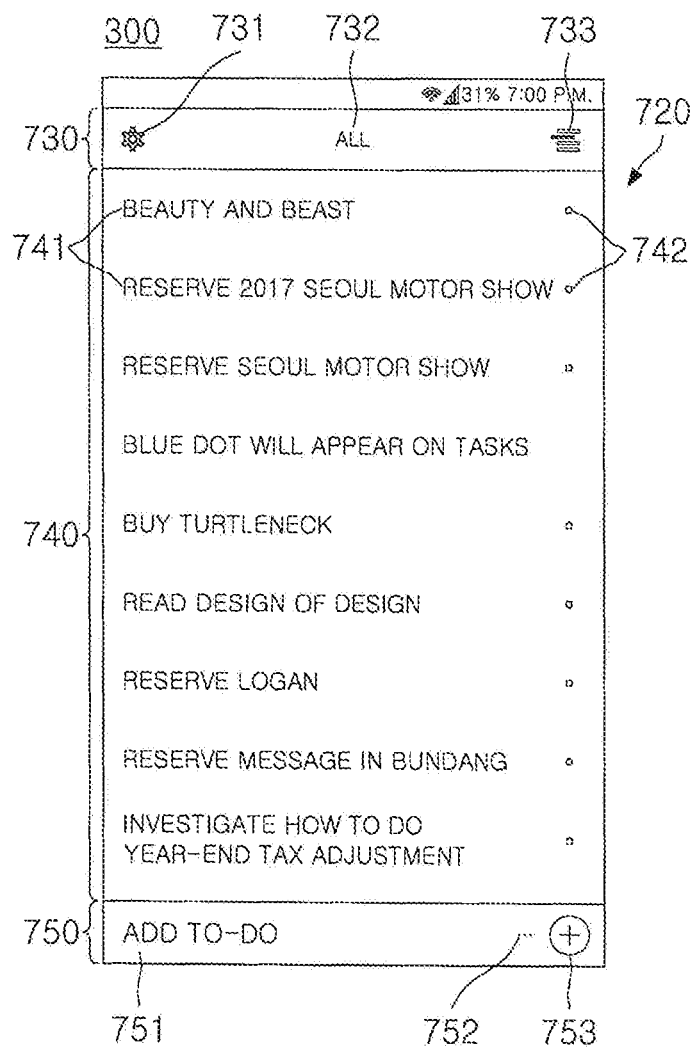

FIGS. 7A and 7B are diagrams referred for describing an operation of the mobile terminal 300 which displays the UI according to an exemplary embodiment of the present invention.

Referring to FIGS. 7A and 7B, the mobile terminal 300 may display a home screen 710 on the display unit 320 according to a user command. In this case, it is assumed that the home screen 710 includes an app icon 715 (for example, a Do icon) corresponding to a to-do application.

When the Do icon 715 displayed on the home screen 710 is selected, the mobile terminal 300 may execute the to-do application corresponding to the selected app icon 715.

The mobile terminal 300 may display a predetermined UI 720 on the display unit 320 when the corresponding application is executed. In this case, the UI 720 displayed on the display unit 320 may include a menu region 730 displaying operation menu items related to the currently executed application, a task list region 740 displaying a to-do list of the terminal user, a text input region 750 for registering a new to-do, and the like.

As another exemplary embodiment, when a home button is input in a state where another application is being executed, the mobile terminal 300 may also display a predefined UI 720 on the display unit 320.

The menu region 730 displayed at an upper end of the UI 720 may include a setting icon 731 for setting an operation environment of the to-do application, a screen switch icon 732 for switching the UI, a clean-up icon 733 for organizing the items registered in the to-do list, a banner icon (not illustrated) for providing the predetermined number of to-do items in the form of preview, and the like.

The task list region 740 displayed in the center of the UI 720 may include the to-do items 741 registered by the terminal user. In this case, the to-do items 741 displayed in the task list region 740 may be arranged in registration time order or in alphabetical order, but the present invention is not limited thereto. Further, the to-do items 741 displayed in the task list region 740 may be configured to be scrolled according to a touch and drag input, a flicking input, or the like of the terminal user.

The task list region 740 may display an indicator 742 indicating whether mobile services related to the items 741 registered in the to-do list are provided in an adjacent region of the corresponding item 741. Accordingly, the terminal user may easily identify whether the mobile service is provided through the corresponding indicator 742.

Even when a word (for example, "reserve ~" and "buy ~") directly indicating the task (or the to-do) of the terminal user is not present in text information corresponding to the to-do item, the mobile terminal 300 may provide a mobile service related to the corresponding item. For example, when "Beauty and Beast" displayed in the UI 720 is selected, the mobile terminal 300 may provide a mobile service related to the selected "Beauty and Beast".

The text input region 750 displayed at a lower end of the UI 720 may include a character input window 751 for inputting text information indicating a new to-do item, a more view icon 752 for additionally displaying another menu (or icon), a registration icon 753 for registering a new to-do item in the to-do list, and the like.

FIGS. 8A-8C and 9A-9C are diagrams referred for describing an operation of the mobile terminal 300 which registers a new to-do in the to-do list.

Figure 8A:
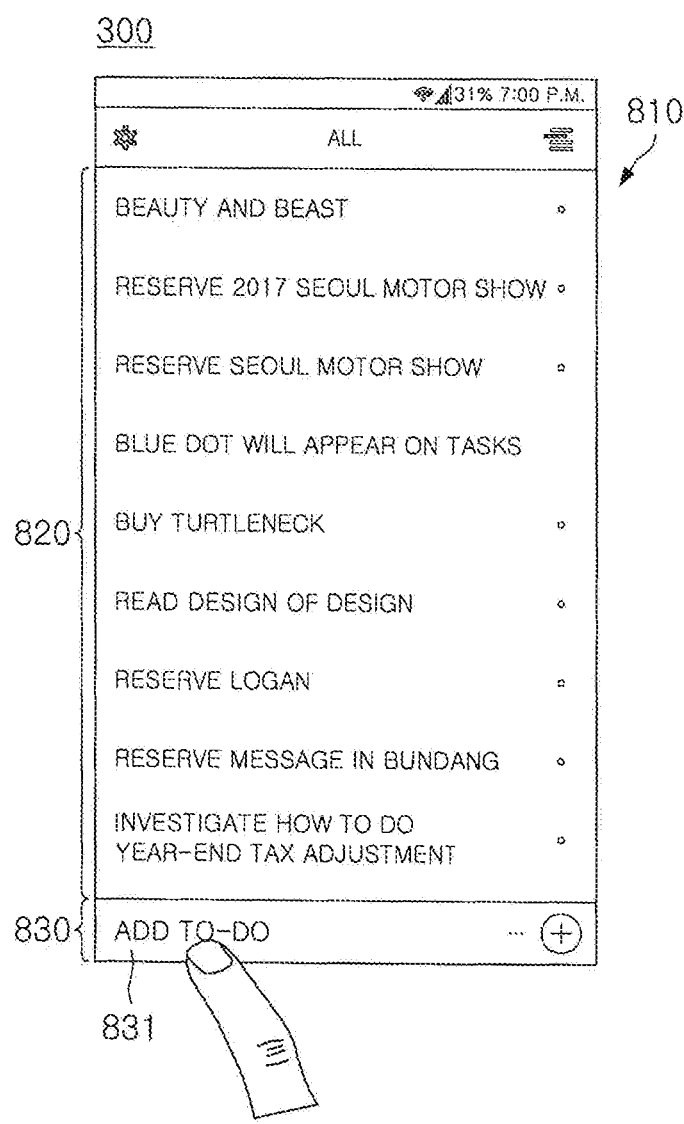
Figure 8B:
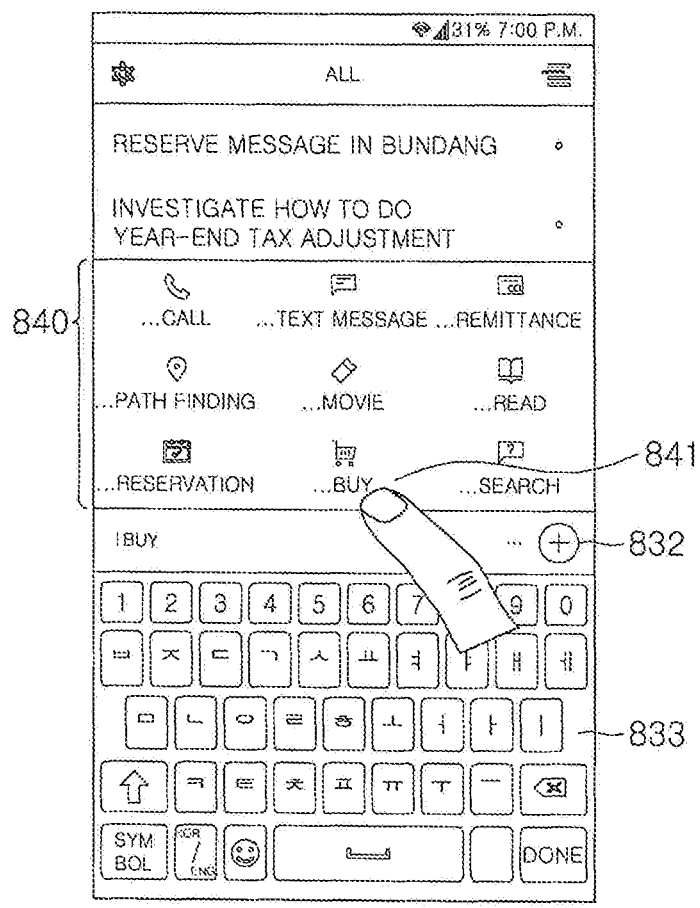

Referring to FIGS. 8A to 8C, the mobile terminal 300 may display a UI 810 for managing a to-do of the terminal user on the display unit 320 according to a user command.

When a character input window 831 displayed at a lower end of the UI 810 is touched, the mobile terminal 300 may enlarge the size of a text input region 830, and decrease the size of a task list region 820 according to a ratio of the enlargement of the task input region 830.

The mobile terminal 300 may display a key pad window 833 for inputting a character at a lower end of the enlarged text input region 830. Further, the mobile terminal 300 may display a category icon collection window 840 indicating representative categories of the to-do items at an upper end of the enlarged text input region 830.

When a first category icon 841 displayed in the category icon collection window 840 is selected, the mobile terminal 300 may automatically input a text (for example, buy) corresponding to the selected category icon 841 in the character input window 831.

When the remaining text (for example, pants) that is the target of the buying is input by using the key pad window 833, the mobile terminal 300 may display the input characters (for example, pants) on the character input window 831.

When a registration icon 832 is touched after the input of the text is completed, the mobile terminal 300 may register the to-do item corresponding to the text information displayed on the character input window 831 in the to-do list. Further, as illustrated in FIG. 8C, the mobile terminal 300 may restore the task list region 820 and the text input region 830 into the original states (that is, the original sizes) and display the newly registered to-do item 821 at the uppermost end of the task list region 820.

Figure 9A:
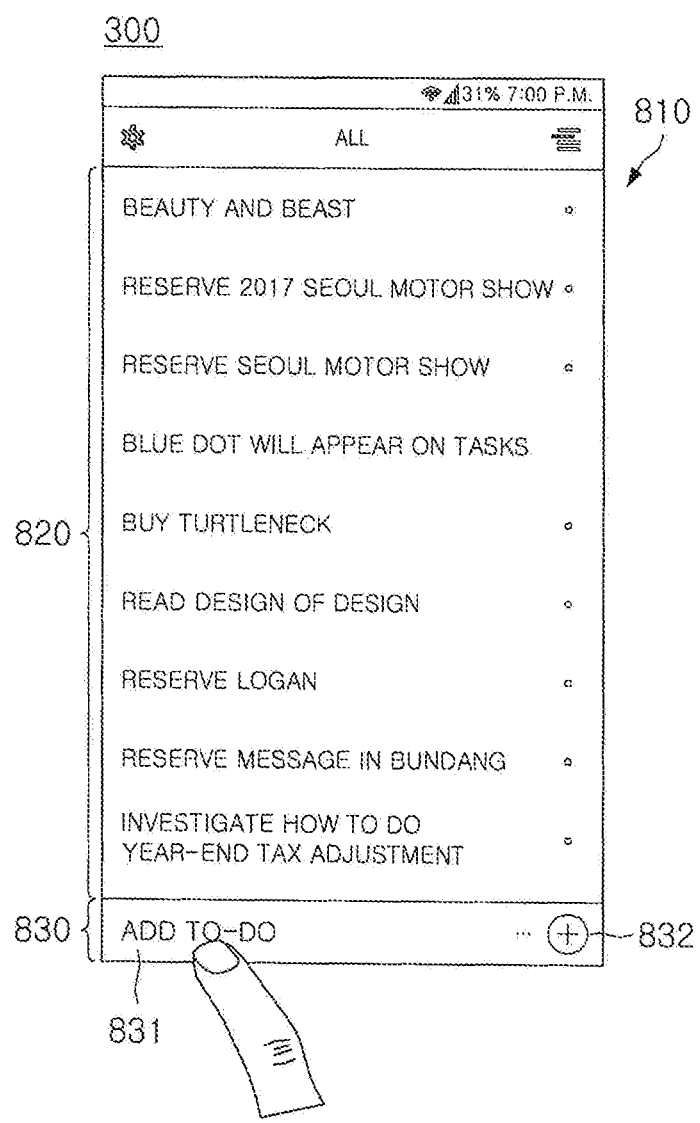
Figure 9B:
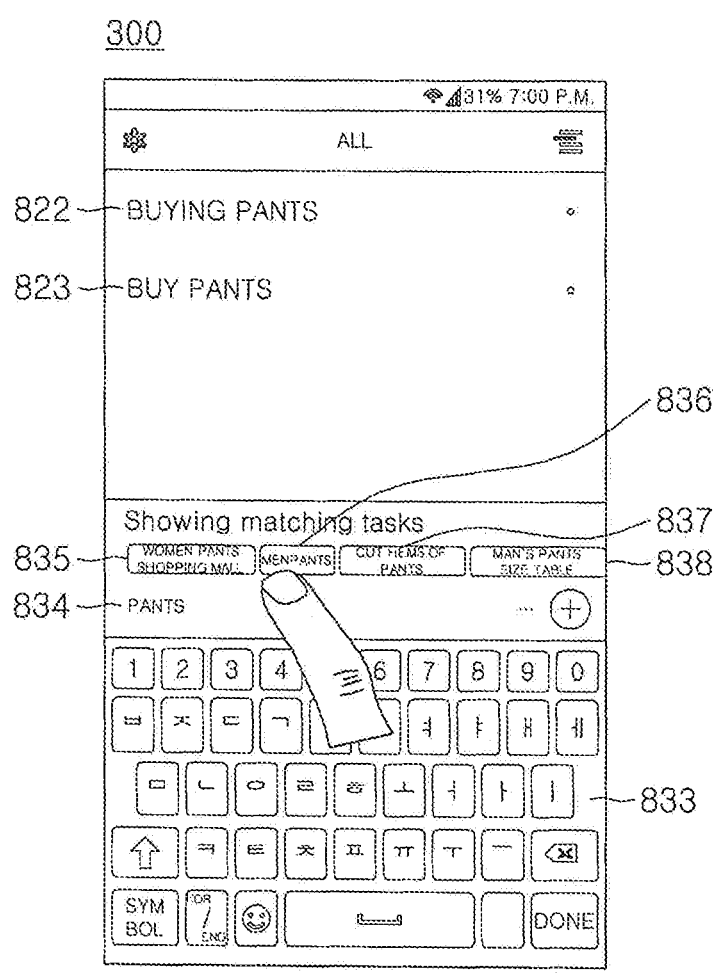
Figure 10A:
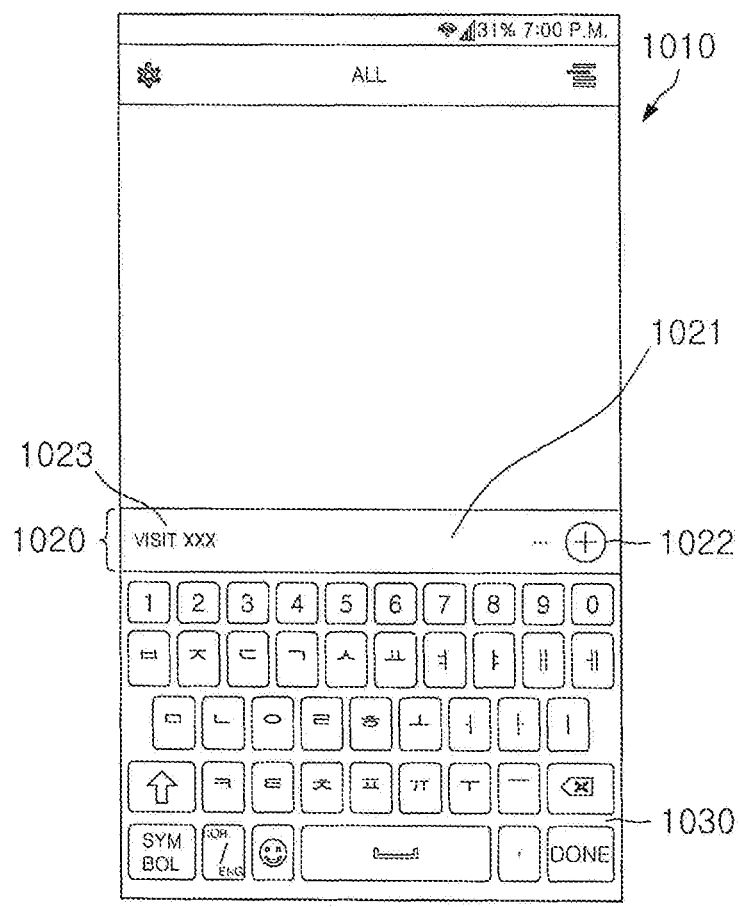
FIGS. 10A to 10F are diagrams referred for describing an operation of the mobile terminal which sets time in a new to-do item.
Figure 10B:
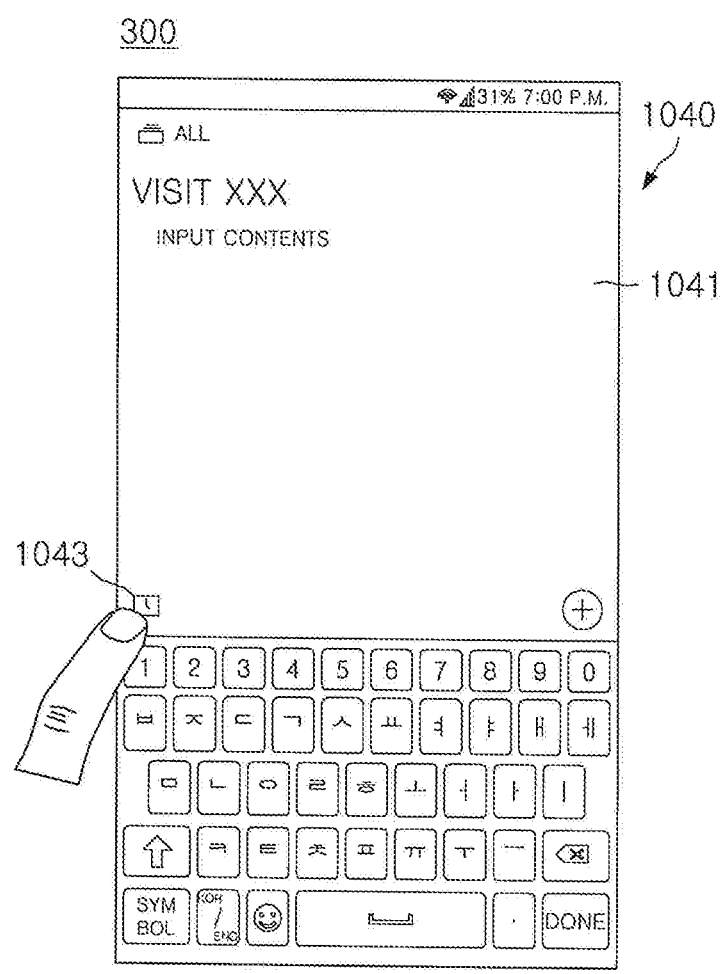
Figure 10C:
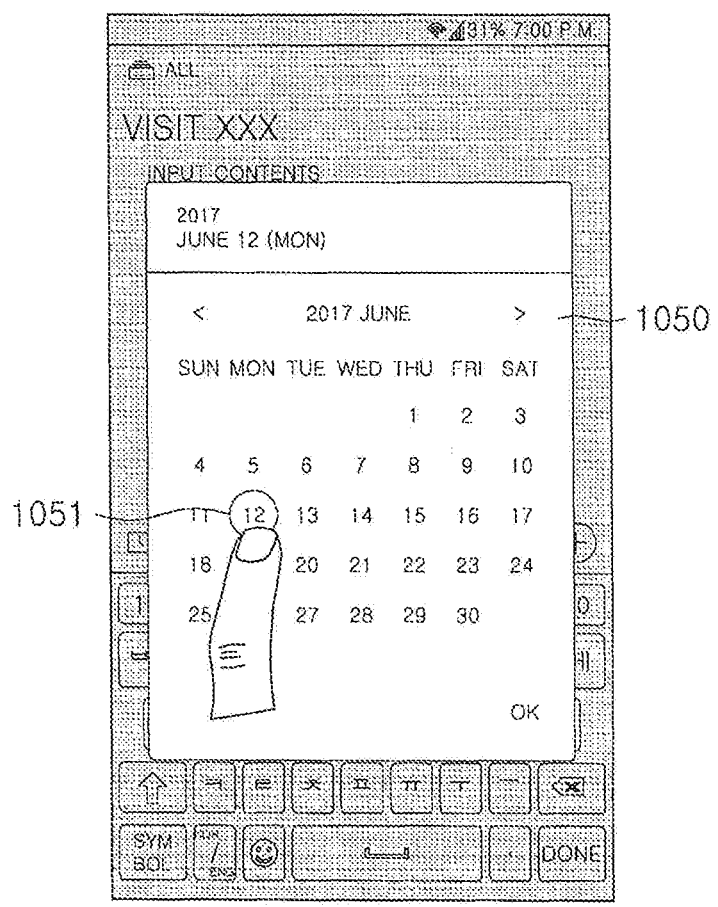
Figure 10D:
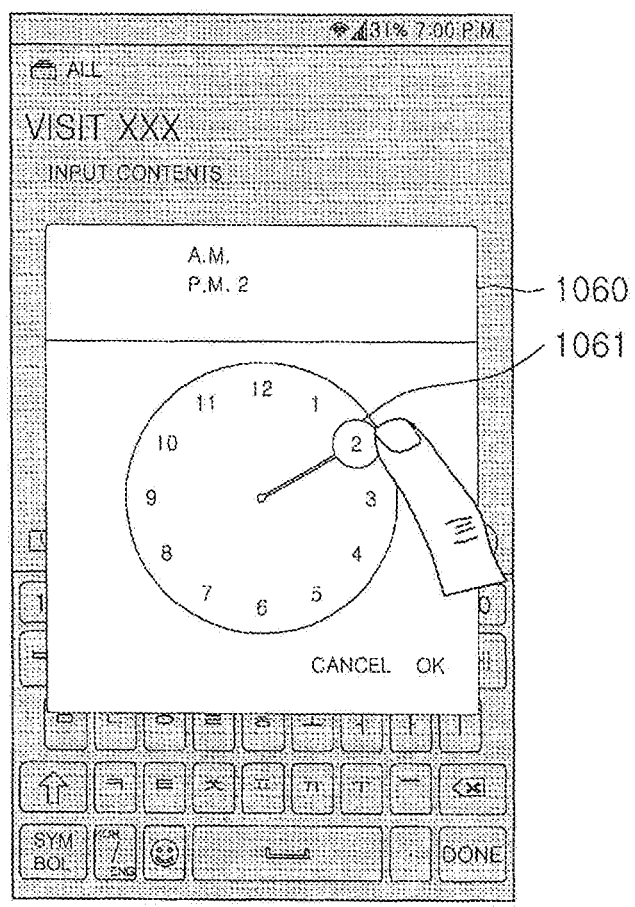
Figure 10E:
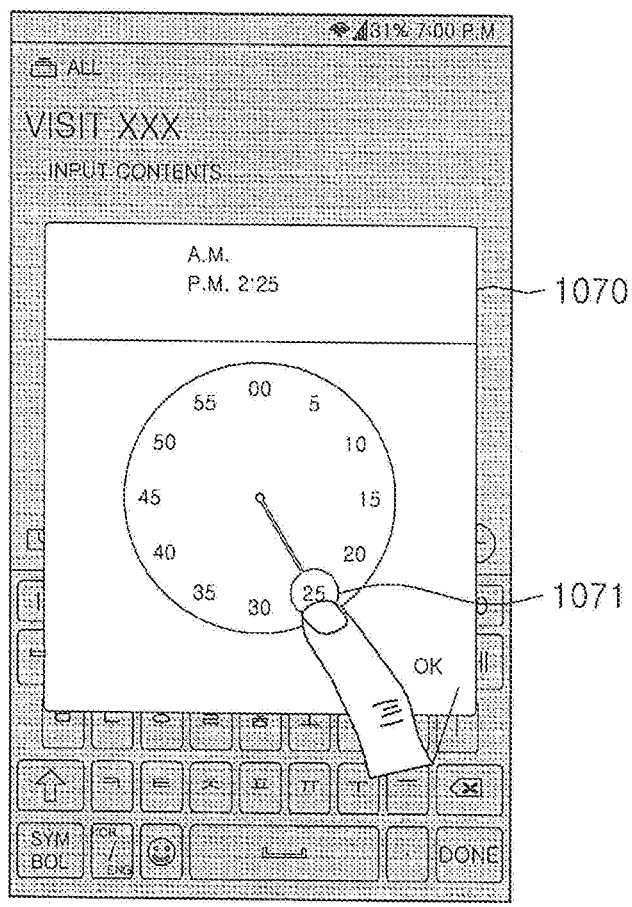
Figure 10F:
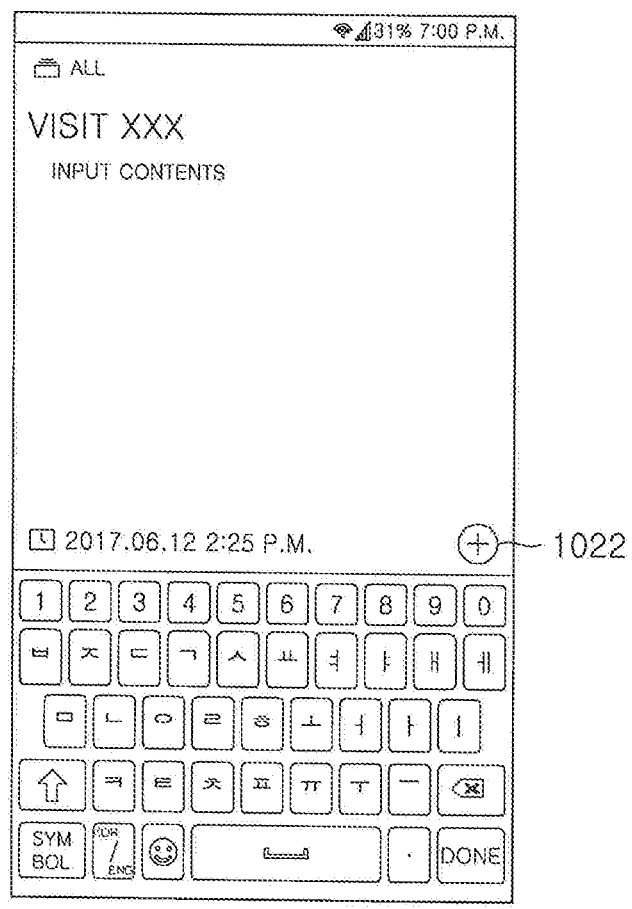

In the meantime, as another exemplary embodiment, as illustrated in FIGS. 9A to 9C, when predetermined characters (for example, pants) are directly input through the key pad window 833 without selecting the category icon, the mobile terminal 300 may display the input characters 834 on the character input window 831.

The mobile terminal 300 may search for to-do items 822 and 823 including the currently input characters 834 in the to-do list, and display the searched to-do items 822 and 823 in the decreased task list region 820.

The mobile terminal 300 may provide an automatic completion function for automatically completing the currently input characters 834 when the character is input. For example, as illustrated in FIG. 9B, the mobile terminal 300 may display one or more elements of text information 835, 836, 837, and 838 including the currently input character 834 at an upper end of the enlarged text input region 830. When any one 836 is selected from the text information 835, 836, 837, and 838, the mobile terminal 300 may automatically input the selected text information 836 to the character input window 831.

In this state, when the registration icon 832 is touched, the mobile terminal 300 may register the to-do item corresponding to the text information displayed on the character input window 831 in the to-do list. Further, as illustrated in FIG. 9C, the mobile terminal 300 may restore the task list region 820 and the text input region 830 into the original states (that is, the original sizes), and display the newly registered to-do item 824 at the uppermost end of the task list region 820.

FIGS. 10A to 10F are diagrams referred for describing an operation of the mobile terminal 300 which sets time in a new to-do item.

Referring to FIGS. 10A to 10F, the mobile terminal 300 may display a first UI 1010 for managing a to-do of the terminal user on the display unit 320 according to a user command.

When a character input window 1021 displayed at a lower end of the first UI 1010 is touched, the mobile terminal 300 may increase the size of a text input region 1020 and decrease the size of the remaining region according to a ratio of the enlargement of the text input region 1020.

The mobile terminal 300 may display a key pad window 1030 for inputting a character at a lower end of the enlarged text input region 1020. When a predetermined text (for example, VISIT XXX) is input through the key pad window 1030, the mobile terminal 300 may display the input text 1023 on the character input window 1021. Then, when a registration icon 1022 is touched, the mobile terminal 300 may register a to-do item corresponding to the text information displayed on the character input window 1021 in the to-do list.

The mobile terminal 300 may display a second UI 1040 which includes a content input region 1041 for inputting detailed contents of a new to-do item, and a time setting icon 1043 for setting time related to the new to-do item on the display unit 320 when the registration icon 1022 is touched.

When the time setting icon 1043 is selected, the mobile terminal 300 may display a calendar image 100 for setting a date corresponding to the new to-do item on the display unit 320.

When a specific date 1051 is selected through the calendar image 1050, the mobile terminal 300 may simultaneously or sequentially display an hour setting image 1060 and a minute setting image 1070 for setting the time of the selected date 1051 on the display unit 320.

When the specific time (for example, 2:25 pm) is selected through the hour setting image 1060 and the minute setting image 1070, the mobile terminal 300 may display the date and time selected by the terminal user on the display unit 320.

Then, when the registration icon 1022 is touched, the mobile terminal 300 may set the date and the time selected by the terminal user in the new to-do item. The time set in the item registered in the to-do list may be used later for performing the to-do clean-up function.

In the foregoing present exemplary embodiment, the case where the time corresponding to the new to-do item is set by using the three setting images is exemplified, but the present invention is not limited thereto, and it will be apparent to those skilled in the art that the corresponding time may be set by using other various schemes.

Figure 11A:
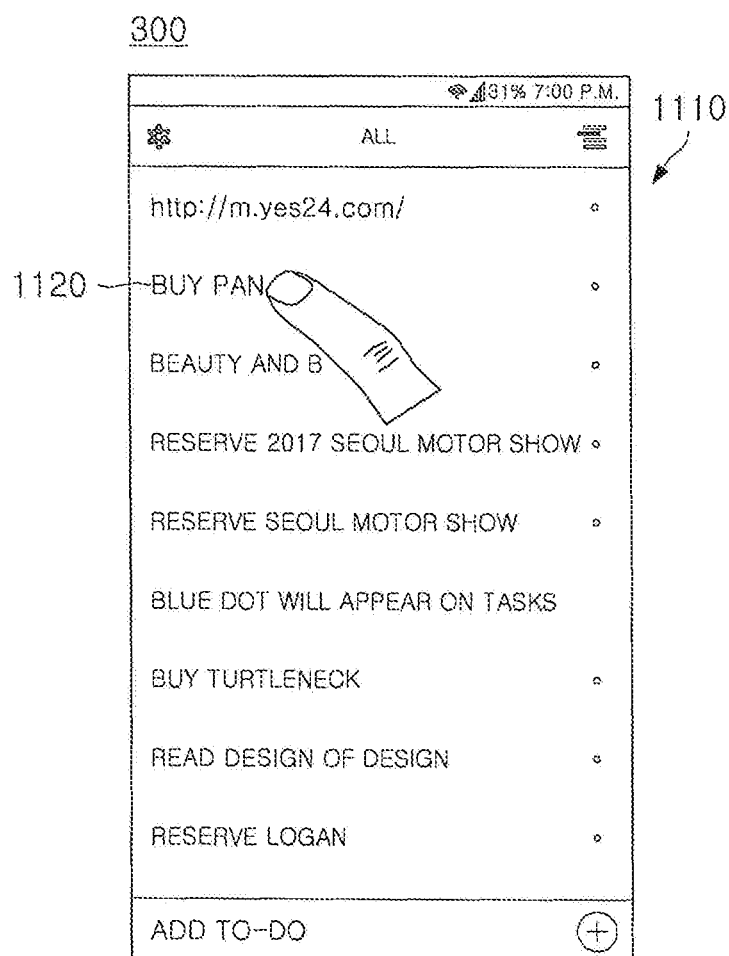
FIGS. 11A and 11B are diagrams referred for describing an operation of the mobile terminal which provides a mobile service related to a to-do item of a terminal user.
Figure 11B:
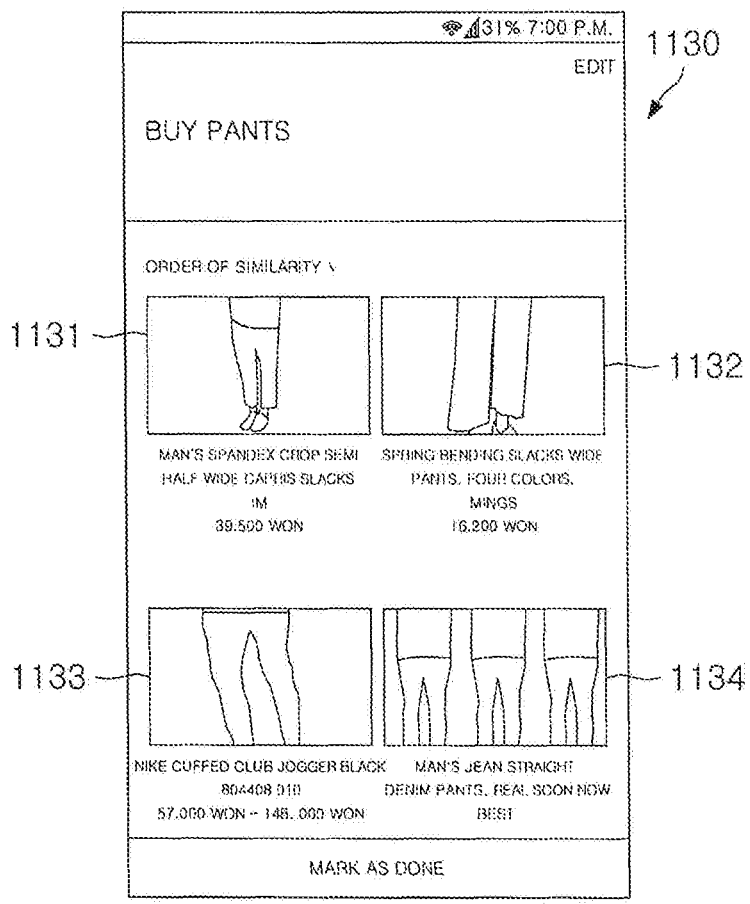

FIGS. 11A and 11B are diagrams referred for describing an operation of the mobile terminal 300 which provides a mobile service related to a to-do item of the terminal user.

Referring to FIGS. 11A and 11B, the mobile terminal 300 may display a first UI 1110 for managing a to-do of the terminal user on the display unit 320 according to a user command.

When any one 1120 among the items displayed in the first UI 1110 is selected, the mobile terminal 300 may display one or more operation option menu items required for fulfilling a task corresponding to the selected item 1120 on the display unit 320.

For example, as illustrated in FIG. 11A, when the task corresponding to the to-do item 1120 selected by the terminal user is "buy pants", the mobile terminal 300 may search for shopping information 1131, 1132, 1133, and 1134 supporting the terminal user to easily buy the pants, and display a second UI 1130 including the searched shopping information 1131, 1132, 1133, and 1134 on the display unit 320. When any one of the shopping information 1131, 1132, 1133, and 1134 is selected, the mobile terminal 300 may access a web site corresponding to the selected shopping information and display a web page provided by the corresponding web site on the display unit 320.

When there exists a pants buying history of the terminal user, the mobile terminal 300 may recommend the shopping information 1131, 1132, 1133, and 1134 in consideration of the corresponding pants buying history. Further, when there exists a buying history for a specific product, the mobile terminal 300 may provide a buying service by using a predetermined pay application (for example, Apple pay, Google pay, etc.).

As described above, the to-do function according to the present invention may provide a reminder function that calls attention of the terminal user, and a function of supporting the terminal user to substantially perform (or complete) the task corresponding to the to-do item.

FIGS. 12A-12C, 13A-13B and 14A-14C are diagrams referred for describing an operation of the mobile terminal 300 which manages the items registered in the to-do list.

Figure 12A:
FIGS. 12A-12C, 13A-B and 14A-14C are diagrams referred for describing an operation of the mobile terminal which manages the items registered in a to-do list.
Figure 12B:
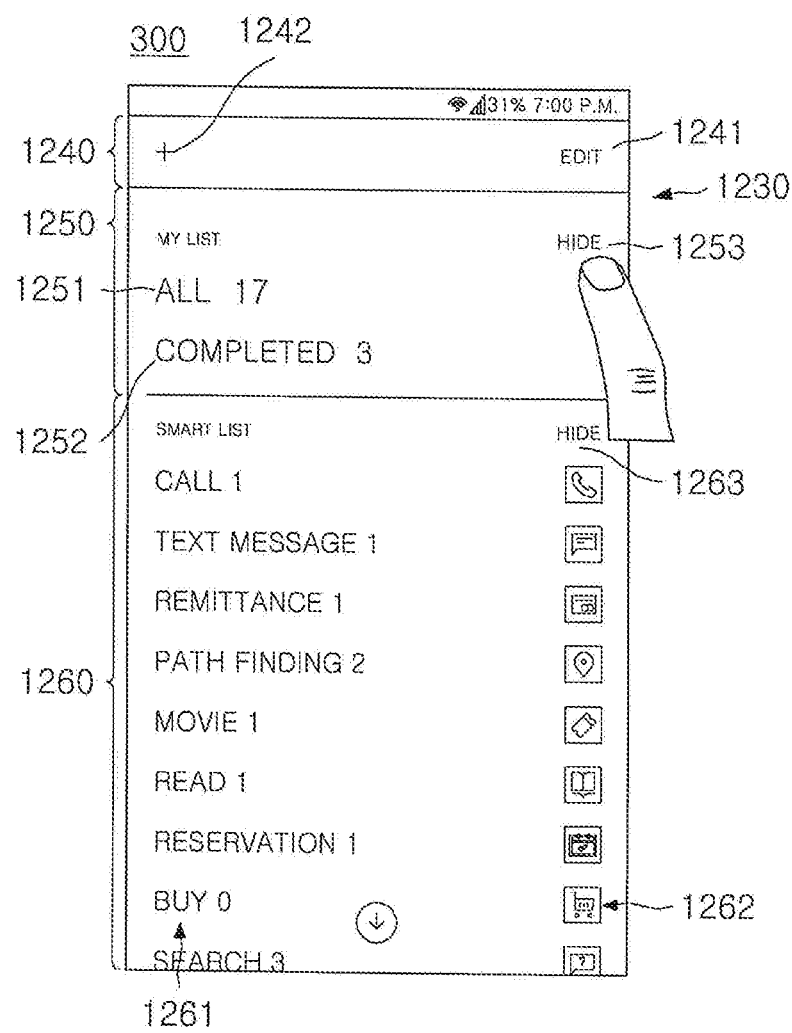
Figure 12C:
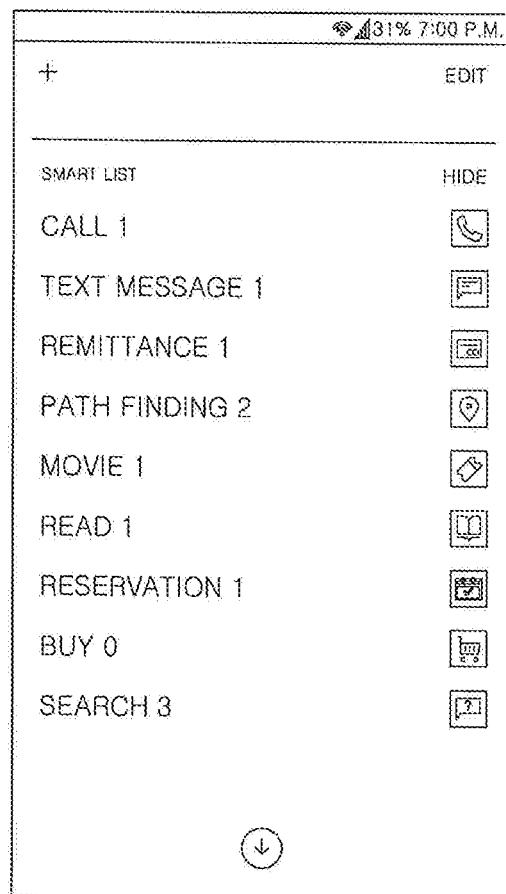

Referring to FIGS. 12A to 12C, the mobile terminal 300 may display a first UI 1210 for managing a to-do of the terminal user on the display unit 320 according to a user command. In this case, the first UI 1210 may include a plurality of items registered in the to-do list of the terminal user.

When a screen switch icon 1220 displayed at an upper end of the first UI 1210 is selected, the mobile terminal 300 may display a predefined second UI 1230 on the display unit 320.

In the present exemplary embodiment, the screen switch icon 1220 may be an "all" icon.

The second UI 1230 may include a menu region 1240 including an edit menu item 1241, an add menu item 1242, and the like, a my-list region 1250 including information about a my-list, a smart list region 1260 including information about, a smart list, and the like.

The my-list region 1250 may include a first menu item 1251 indicating the number of all of the to-do items, a second menu item 1252 indicating the number of items completed by the terminal user, a first Hide menu item 1253 for hiding the my-list region 1250, a category item (not illustrated) generated by the terminal user, and the like.

The smart list region 1260 may include one or more category items 1261 indicating the kinds of categories for the plurality of items registered in the to-do list and the number of items for each category, a category icon 1262 indicating each category item, a second Hide menu item 1263 for hiding the smart list region 1260, and the like. The category items listed in the smart list region 1260 may be fixed and provided as a default by the mobile terminal 300 or the server 200.

The mobile terminal 300 may classify the corresponding items into the predetermined number of categories according to an attribute and/or a kind of the plurality of items registered in the to-do list of the terminal user and manage the classified corresponding items. The kinds of categories include "call", "text message", "remittance", "path finding", "movie", "read", "reservation", "buy", "investigation", and the like, but are not limited thereto. The category icons listed in the smart list region 1260 may be the same as the category icons included in the category icon collection window 840 illustrated in FIGS. 8A-8C and 9A-9C. Accordingly, even though the terminal user does not separately organize the to-do list, the mobile terminal 300 may collect and display the similar to-do items through the smart list.

When the first Hide menu item 1253 displayed in the my-list region 1250 is selected, the mobile terminal 300 may hide the my-list region 1250 displayed on the current screen (FIG. 12C). Similarly, although not illustrated in the drawing, when the second Hide menu item 1263 displayed in the smart list region 1260 is selected, the mobile terminal 300 may hide the smart list region 1260 displayed on the current screen.

Figure 13A:
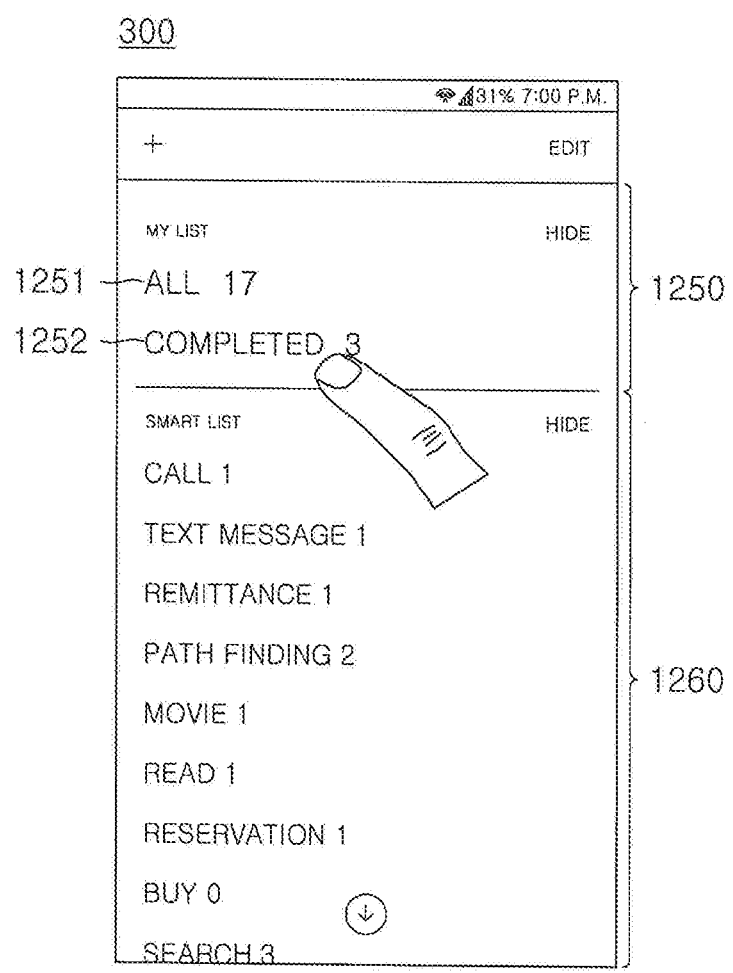
Figure 13B:
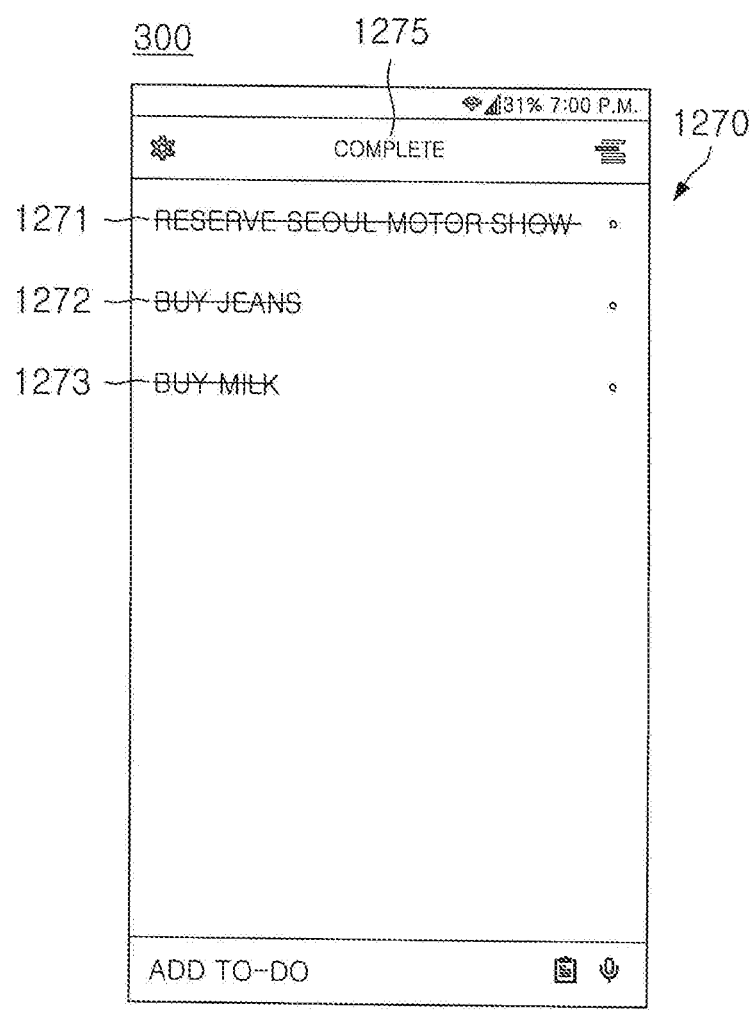

As illustrated in FIGS. 13A and 13B, when the second menu item 1252 displayed in the my-list region 1250 is selected, the mobile terminal 300 may display a third UI 1270 including to-do items 1271, 1272, and 1273 (shown with a strikethrough) completed, by the terminal user on the display unit 320. In this case, a screen switch icon 1275 displayed at an upper end of the third UI 1270 may be a "Completed" icon.

When the mobile terminal 300 receives an input (not illustrated) of touching any one of the to-do items 1271, 1272, and 1273 displayed on the third UI 1270 and then dragging the touched one in a direction of a boundary of the display unit 320, the mobile terminal 300 may delete the touched and dragged item from the third UI 1270.

Figure 14A:
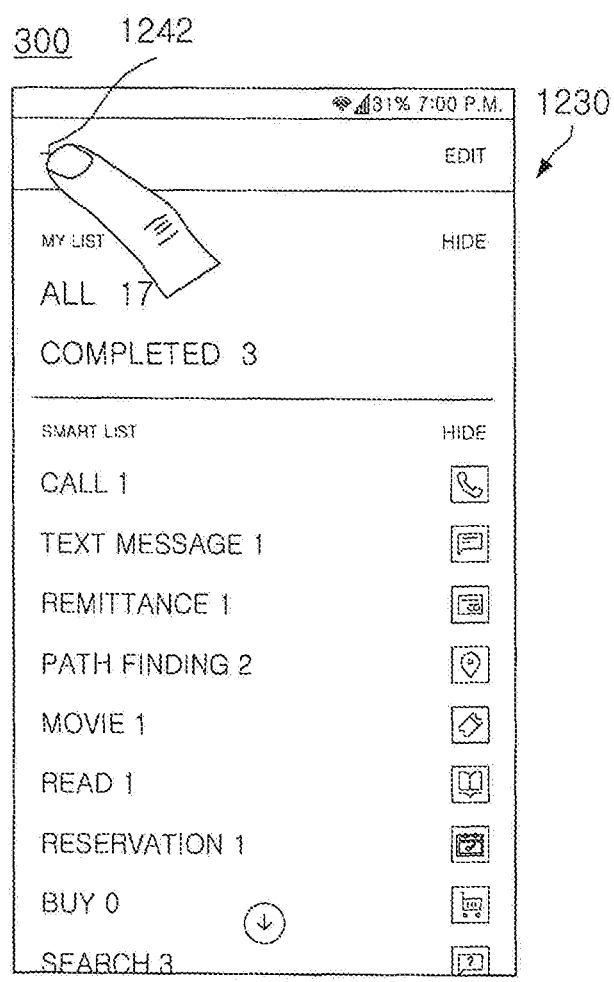
Figure 14B:
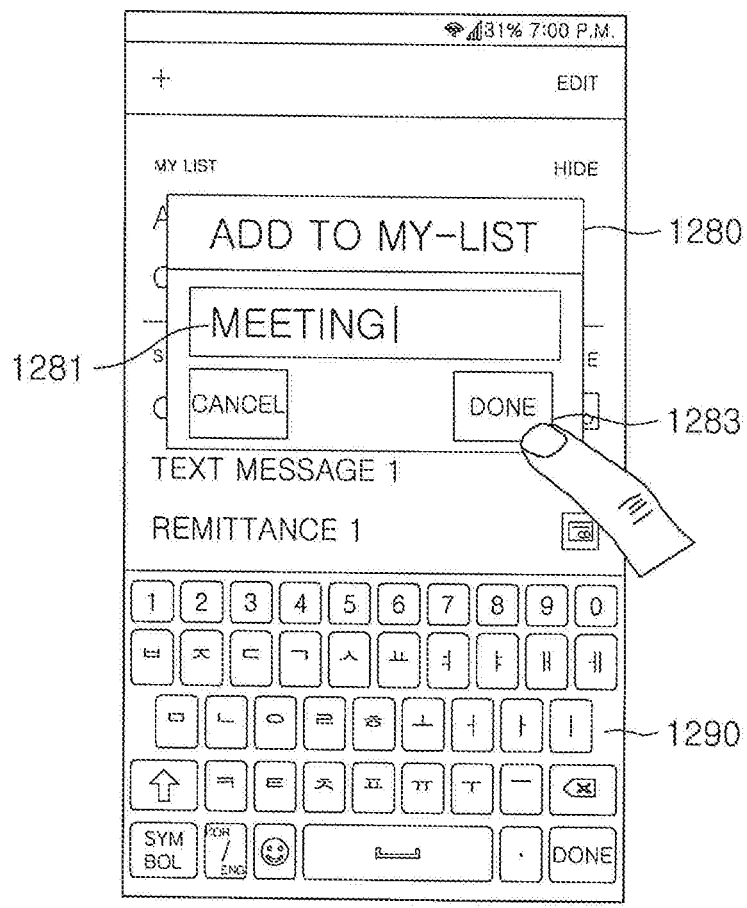
Figure 14C:
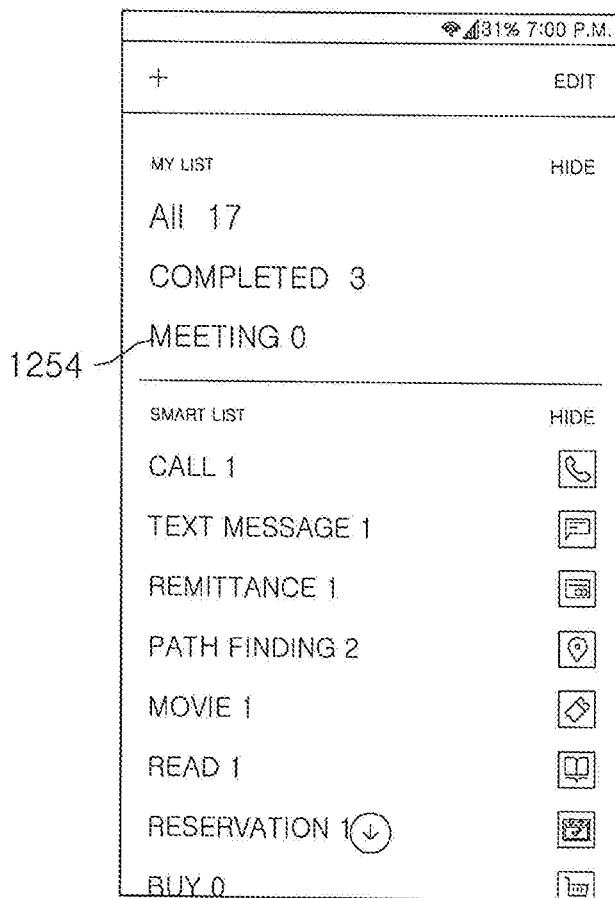

As illustrated in FIGS. 14A to 14C, when the add menu item 1242 displayed at an upper end of the second UI 1230 is selected, the mobile terminal 300 may display a pop-up window 1280 for adding a new list item to the my-list region 1250 and a keypad window 1290 for inputting a predetermined text to the pop-up window 1280 on the display unit 320.

When a completion button 1283 is selected after a text 1281 corresponding to the new list item is input through the keypad window 1290, the mobile terminal 300 may generate a new list item (that is, a category item) 1254 and display the generated new list item in the my-list region 1250. Unlike the category items of the smart list, the category items of the my-list may be directly added/deleted or edited by the terminal user.

Although not illustrated, when any one of the category items displayed in the my-list region 1250 and the smart list region 1260 is selected, the mobile terminal 300 may display a fourth UI (not illustrated) including the to-do items belonging to the selected category item on the display unit 320.

FIGS. 15A to 15E are diagrams referred for describing an operation of the mobile terminal 300 that registers a to-do of the terminal user by using, a clip icon.

Referring to FIGS. 15A to 15E, the mobile terminal 300 may display a UI 1510 for managing the to-do list of the terminal user on the display unit 320.

When a more view icon 1532 displayed in a text input region 1530 of the 1510 is selected, the mobile terminal 300 may enlarge the text input region 1530, and decrease a task list region 1520 according to a ratio of the enlargement of the text input region 1530.

The mobile terminal 300 may display a clip icon 1534 and a voice recognition icon 1535 in the enlarged text input region 1530 when the more view icon 1532 is selected. In this case, the clip icon 1534 and the voice recognition icon 1535 may be displayed in an adjacent region of the character input window 1531. When the voice recognition icon 1535 is selected, the mobile terminal 300 may activate a voice recognition mode and display guidance information requesting a voice input on the display unit 320. When a voice signal of the user is input through a microphone, the mobile terminal 300 may automatically input text information corresponding to the voice signal to the character input window 1531.

When the clip icon 1534 is selected, the mobile terminal 300 may display clip information 1536 which the terminal user most recently copied in the enlarged text input region 1530.

When the clip information 1536 displayed in the text input region 1530 is selected, the mobile terminal 300 may automatically input the selected clip information 1536 to the character input window 1531. Then, when the registration icon 1533 is selected, the mobile terminal 300 may register a to-do item corresponding to the text information 1536 displayed on the character input window 1533 in the to-do list.

Figure 15A:
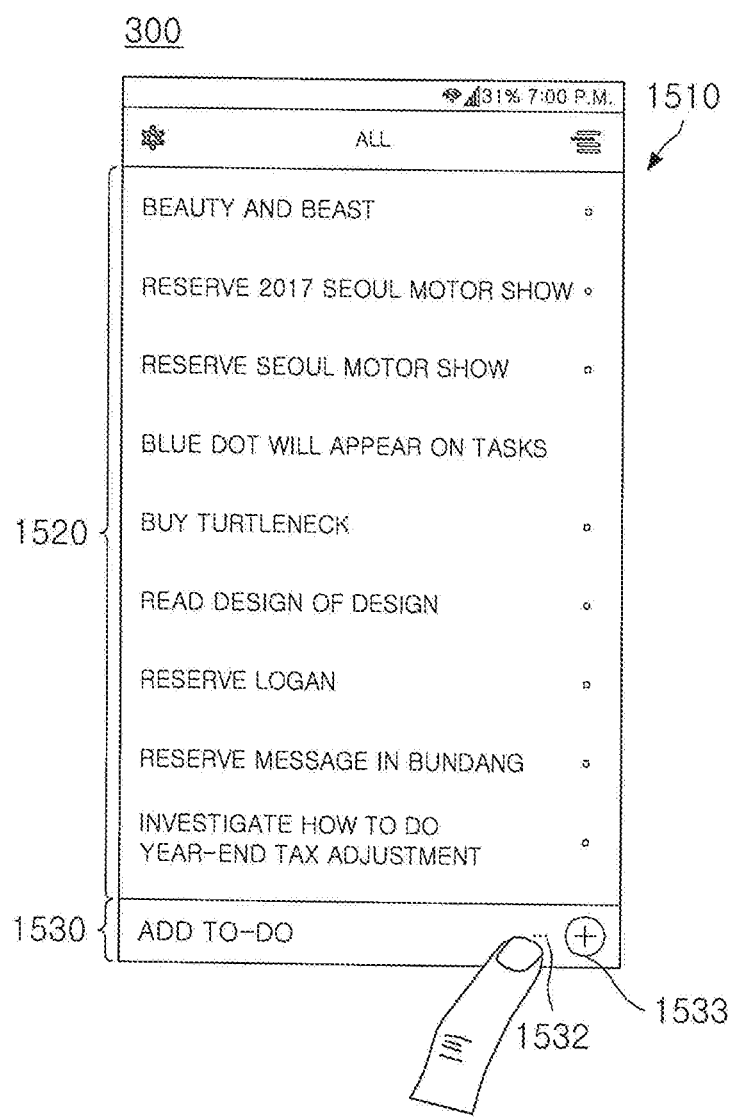
FIGS. 15A to 15E are diagrams referred for describing an operation of the mobile terminal which registers a to-do of the terminal user by using a clip icon.
Figure 15B:
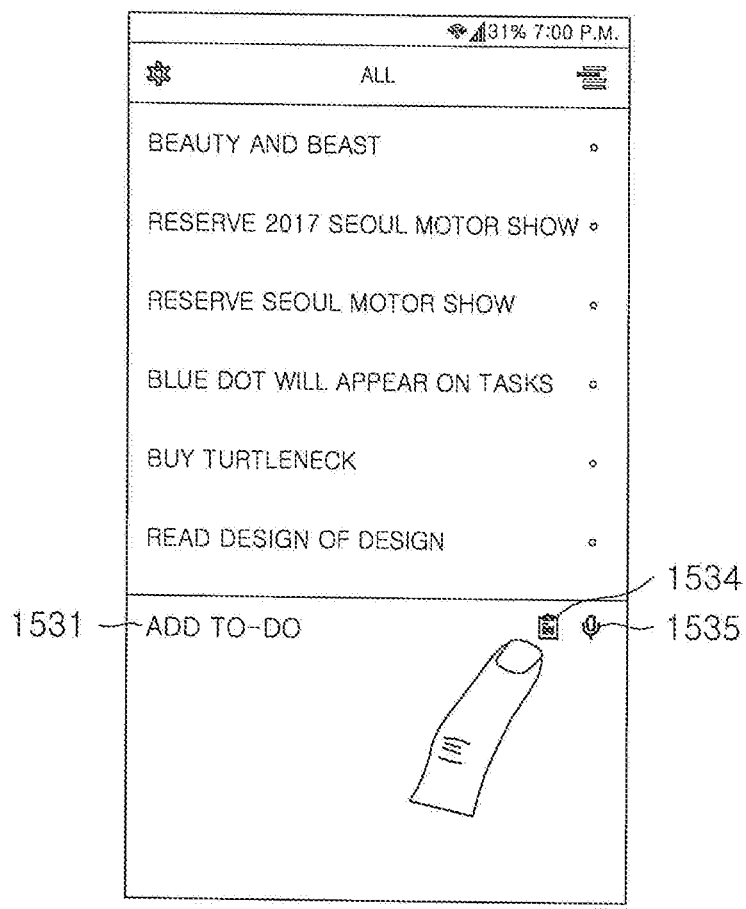
Figure 15C:
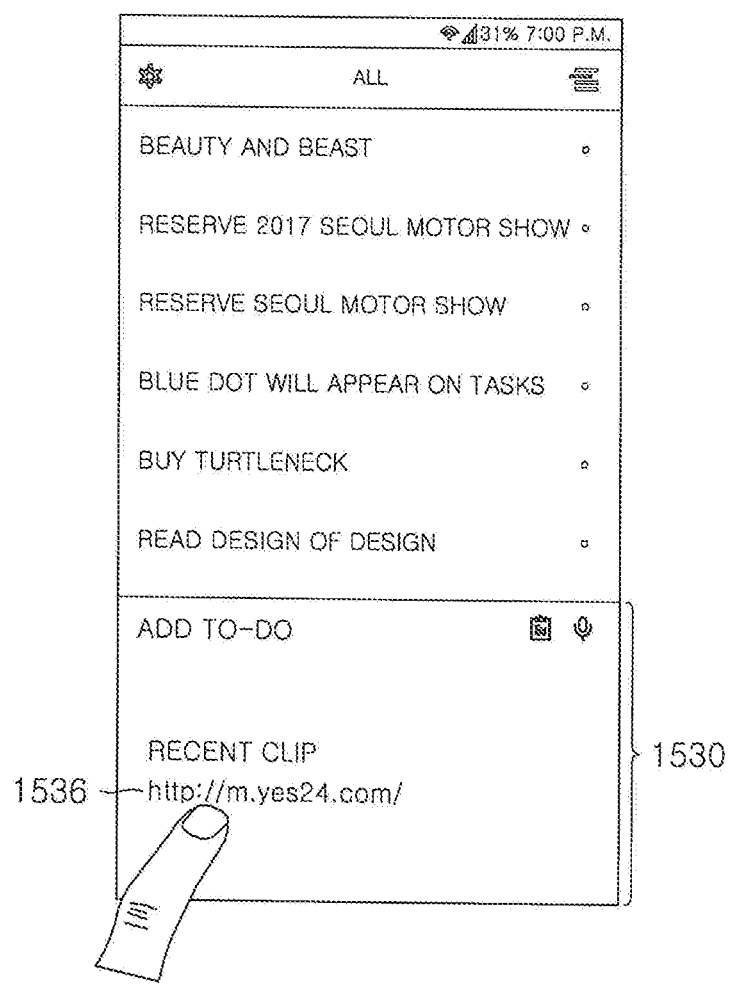
Figure 15D:
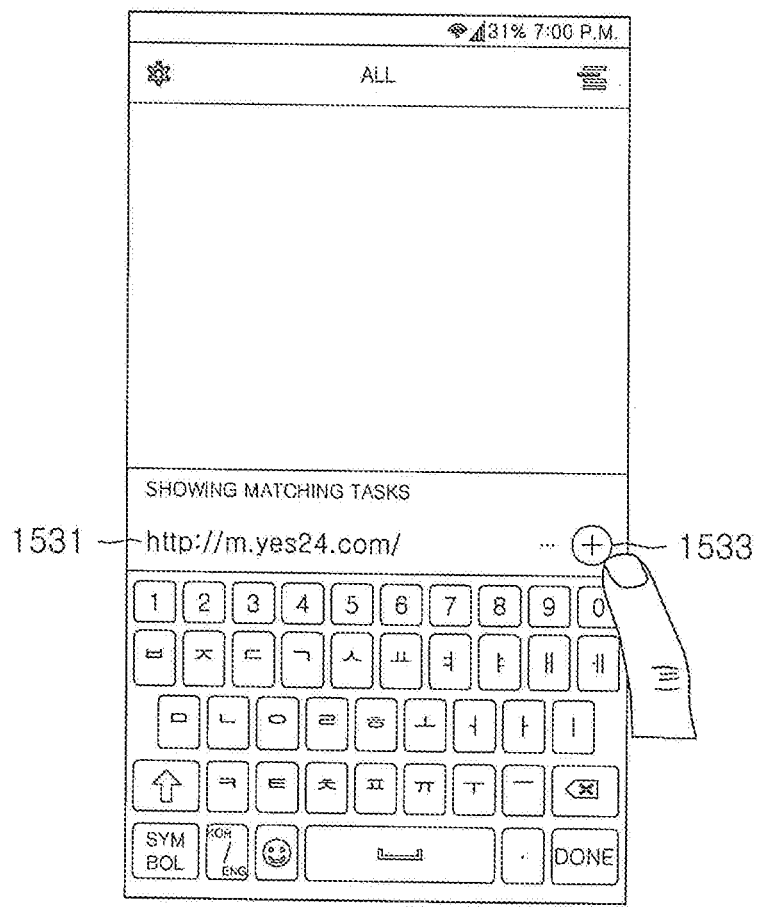
Figure 15E:

As illustrated in FIG. 15E, the mobile terminal 300 may restore the task list region 1520 and the text input region 1530 to the original states (that is, the original sizes), and display the newly registered to-do item 1521 on the uppermost end of the task list region 1520.

Figure 16A:
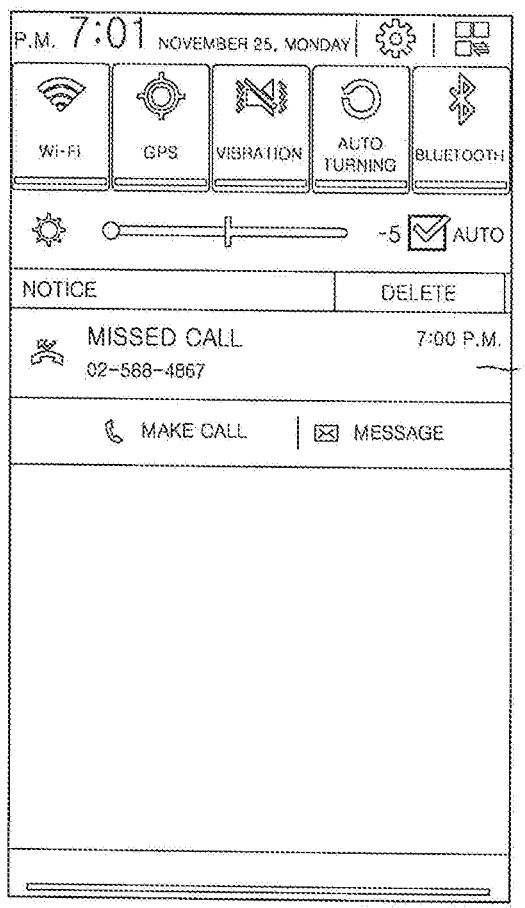
FIGS. 16A and 16B are diagrams referred for describing an operation of the mobile terminal which automatically registers contact information in a to-do list when a missed call is indicated.
Figure 16B:
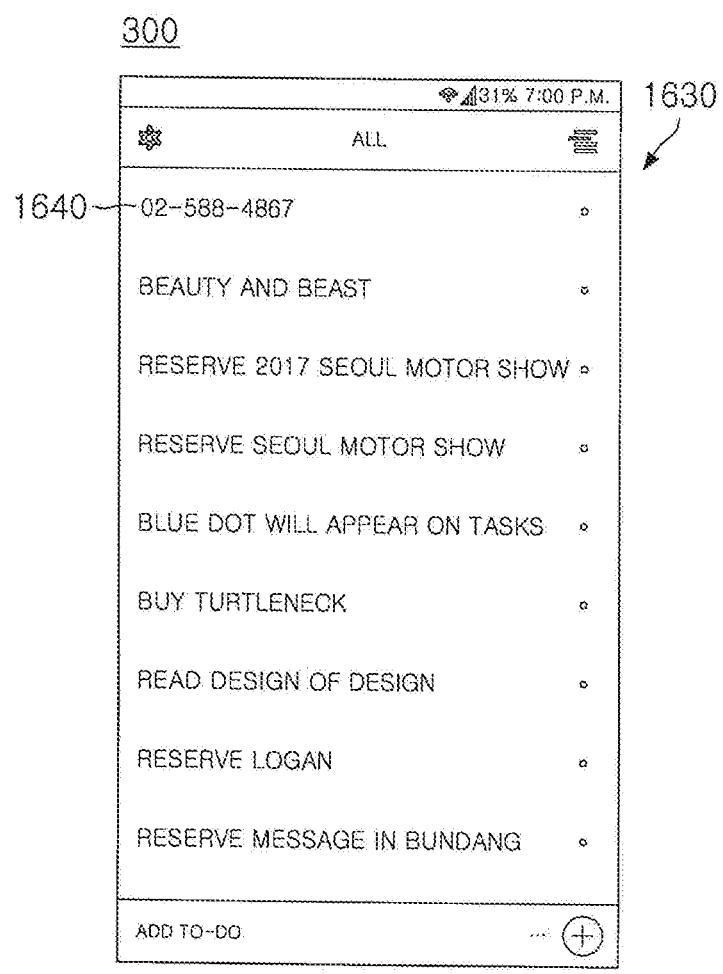

FIGS. 16A and 16B are diagrams referred for describing an operation of the mobile terminal 300 which automatically registers contact information in the to-do list when a missed call is indicated.

Referring to FIGS. 16A and 16B, when a missed call is indicated, the mobile terminal 300 may display notification information 1620 indicating the existence of the corresponding missed call on a notification screen 1610. Further, the mobile terminal 300 may display a notification icon (not illustrated) indicating the existence of the corresponding missed call in a state bar positioned at the upper end of the display unit 320.

When a missed call is indicated, the mobile terminal 300 may automatically add contact information corresponding to the missed call to the to-do list. Accordingly, when the to-do application is executed, the mobile terminal 300 may display a UI 1630 including contact information 1640 corresponding to the missed call as a new to-do item on the display unit 320.

When the item 1640 added to the UI 1630 is selected, the mobile terminal 300 may make a call with the contact information corresponding to the selected item 1640. As another exemplary embodiment, the mobile terminal 300 may provide a call menu item, a message menu item, and the like so as to support the terminal user to perform a task related to the selected item 1640, FIG. 17 is a diagram referred for describing an operation of the mobile terminal 300 which predicts and provides a repeated task of the terminal user based on log information.

Figure 17:
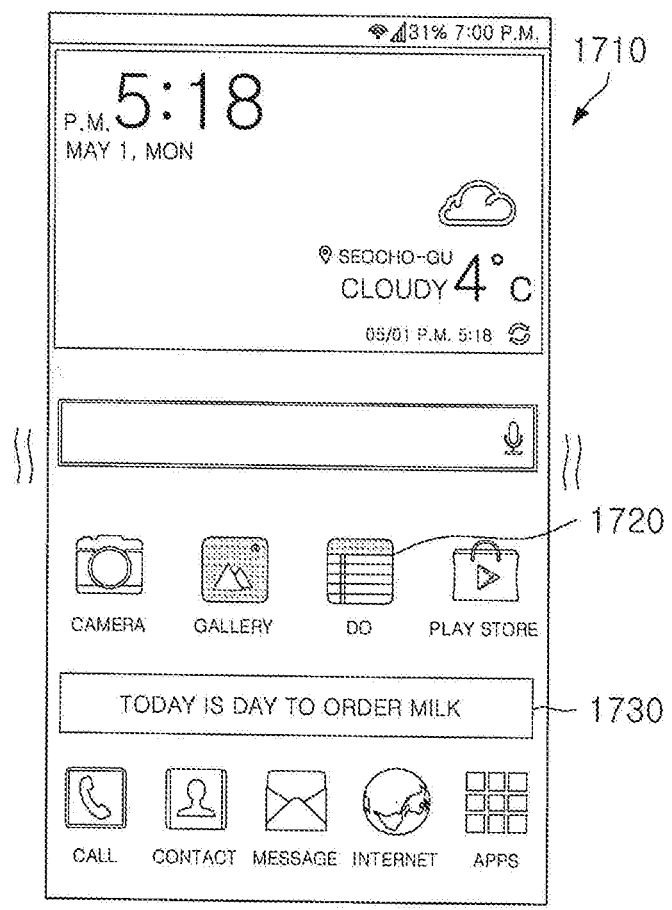
FIG. 17 is a diagram referred for describing an operation of the mobile terminal which predicts and provides a repeated task of a terminal user based on log information.

Referring to FIG. 17, the mobile terminal 300 may display a predetermined operation screen 1710 on the display unit 320 according to a user command. In the present exemplary embodiment, it is assumed that the mobile terminal 300 is in a state in which the to-do application is being executed as a background.

The mobile terminal 300 may store log information about all of the to-do items in the memory 340 and manage the log information. The mobile terminal 300 may predict (analyze) a task (or a to-do) which the terminal user periodically fulfills based on the log information stored in the memory 340.

The mobile terminal 300 may display a notification message 1730 indicating the predicted task on the display unit 320 for a predetermined time. At the same time, the mobile terminal 300 may output at least one of an auditory notification signal (for example, an alarm signal) and a tactile notification signal (for example, a haptic signal) in order to call attention of the terminal user. Through the notification message 1730 and the notification signals, the terminal user may perform the to-do without missing the to-do.

Figure 18:
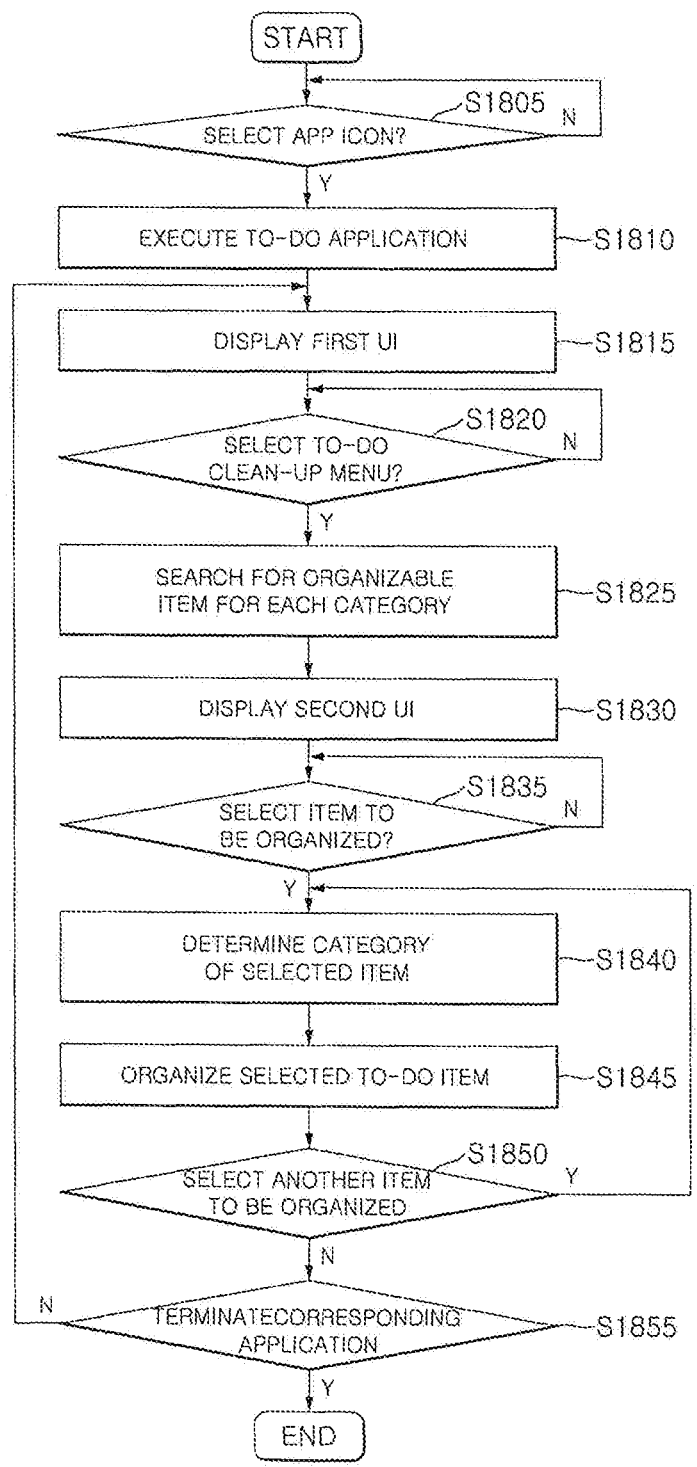
FIG. 18 is a flowchart for describing an operation of a mobile terminal according to another exemplary embodiment of the present invention.

FIG. 18 is a flowchart for describing an operation of a mobile terminal according to another exemplary embodiment of the present invention.

Referring to FIG. 18, the control unit 350 may display a home screen or a menu screen on a display unit 320 according to a user command. In this case, it is assumed that the home screen or the menu screen includes an app icon (for example, a Do icon) corresponding to a "to-do application".

When the "Do icon" displayed on the home screen or the menu screen is selected (S1805), the control unit 350 may execute the to-do application corresponding to the selected app icon (S1810).

The control unit 350 may display a predefined first UI on the display unit 320 when the corresponding application is executed (S1815). For example, as illustrated in FIG. 6, the first UI 600 displayed on the display unit 320 may include a state bar region 610 displaying an operation state of the mobile terminal 300, a menu region 620 displaying operation menu items related to a currently executed application, a task list region 630 displaying a to-do list of the terminal user, a text input region 640 for registering a new to-do item in a to-do list, and the like.

The menu region 630 displayed at an upper end of the first UI 600 may include a setting icon for setting an operation environment of the to-do application, a screen switch icon for switching the UI, a clean-up icon for organizing the items registered in the to-do list, and the like.

When the clean-up icon displayed in the menu region 630 is selected (S1820), the mobile terminal 300 may search for (or extract) organizable items (or organizable to-do items) by category in the plurality of items registered in the to-do list (S1825). Herein, the categories of the organizable items (i.e. items that are the targets of the organization) may include a "to-do today", an "old to-do (or a predetermined time elapsed to-do)", an "overlapping to-do", a "to-do shiftable to my-list", a "completed to-do", and the like, but are not limited thereto.

The mobile terminal 300 may search for the organizable items by using a predetermined scheme according to the kind of category.

For example, in a case of the "to-do today", the mobile terminal 300 may search for the organizable items by analyzing time information set in the items registered in the to-do list, text information of each item, and the like.

In a case of the "old to-do", the mobile terminal 300 may search for the organizable items by analyzing time information set in the items registered in the to-do list, information on time at which the items included in the to-do list are first registered, text information of each item, and the like. Herein, a reference time for determining the "old to-do" may be set by the terminal user or may be set as a default by the mobile terminal 300 or the server 200.

In a case of the "overlapping to-do", the mobile terminal 300 may extract main keywords from the text information of the items registered in the to-do list, and search for organizable items based on similarity between the extracted main keywords.

In a case of the "to-do shiftable to my-list", the mobile terminal 300 may extract main keywords from the text information of the items registered in the to-do list, and search for organizable items by determining similarity between the extracted main keywords and category items included in the my-list.

In a case of the "completed to-do", the mobile terminal 300 may search for organizable items by determining whether the mobile services related to the items registered in the to-do list are executed, whether the items registered in the to-do list are selected, and the like.

The mobile terminal 300 may display a second UI for collecting and displaying the organizable items by category on one screen on the display unit 320 (S1830).

When at least one among the items displayed in the second UI is selected (S1835), the mobile terminal 300 may determine the category to which the selected to-do item belongs (S1840). The mobile terminal 300 may organize the selected to-do items by using a predetermined scheme according to the kind of determined category (S1845).

For example, when the determined categories are the "to-do today", the "old to-do", and the "overlapping to-do", the mobile terminal 300 may delete the selected to-do item from the to-do list. In this case, the mobile terminal 300 may display an indicator indicating that the selected item is deleted from the to-do list in the corresponding item or an adjacent region of the corresponding item.

When the determined category is the "to-do shiftable to my-list", the mobile terminal 300 may shift the selected to-do item to a corresponding category item of the my-list.

When another item to-be organized is selected through the second UI (S1850), the mobile terminal 300 may repeatedly perform operations S1840 and S1845.

When another item to-be organized is not selected through the second UI (S1850), the mobile terminal 300 may repeatedly perform operations S1815 to S1850 until the corresponding application is terminated.

In the present exemplary embodiment, the case where the mobile terminal 300 provides the mobile service related to the "to-do clean-up function" is exemplified, but the present invention is not limited to this embodiment, and it will be apparent to those skilled in the art that the mobile terminal 300 and the server 200 may interwork with each other to provide the mobile service related to the "to-do clean-up function".

Hereinafter, in the present specification, the operations of the mobile terminal which is capable of conveniently organizing the plurality of items registered in the to-do list by using the UI according to the present invention will be described in detail with reference to FIGS. 19A-19C, 20A-20C, 21A-21C, 22A-22C and 23A to 23F.

Figure 19A:
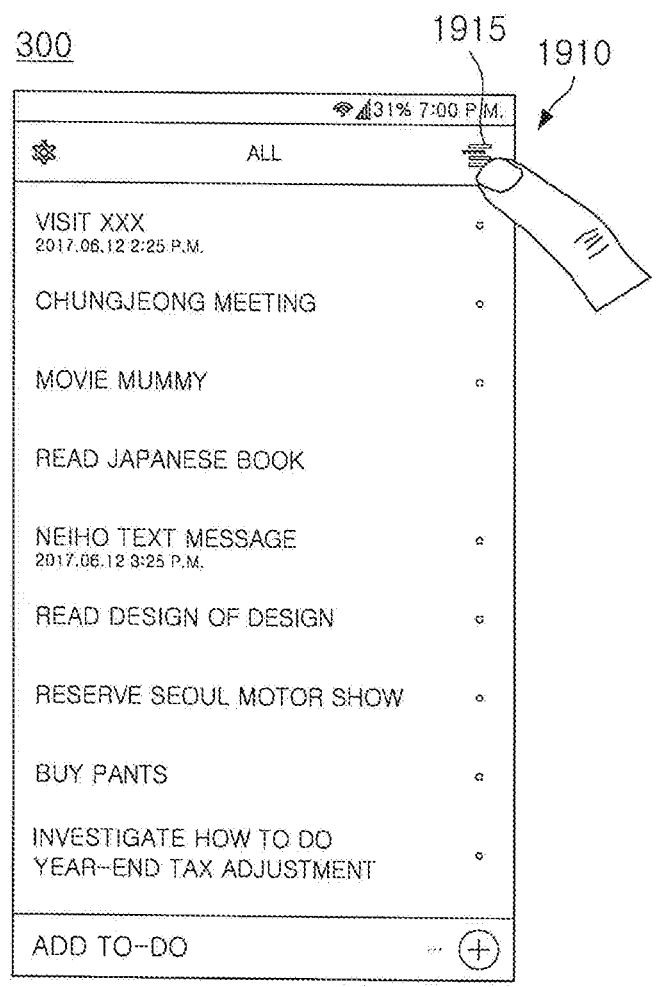
FIGS. 19A to 19C are diagrams referred for describing an operation of the mobile terminal which provides a guidance message related to a to-do clean-up function.
Figure 19B:
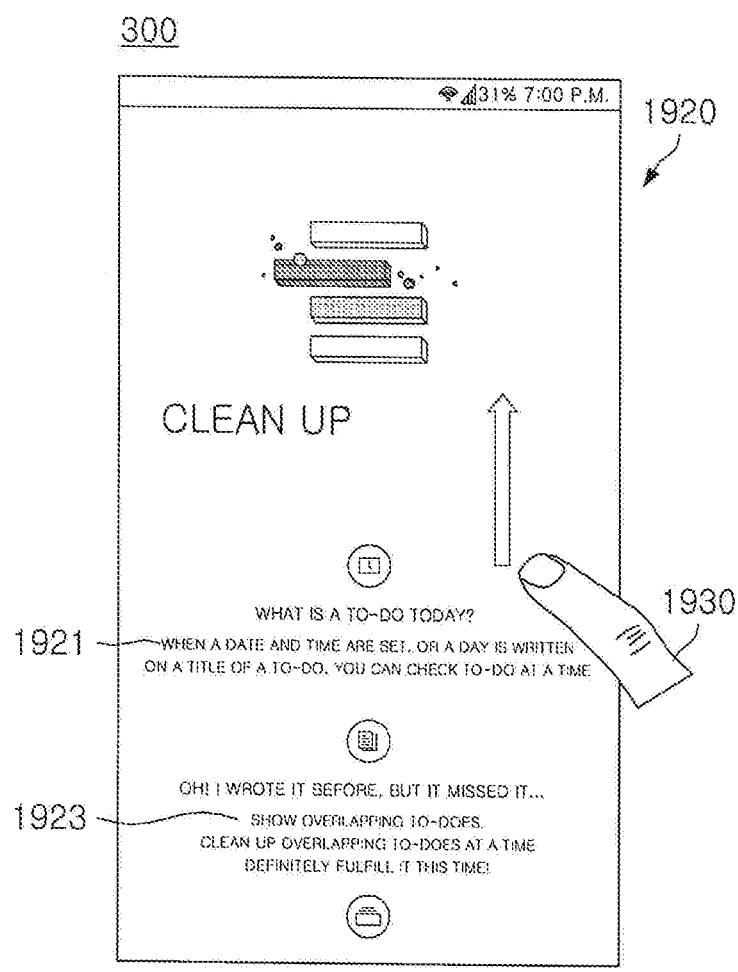
Figure 19C:
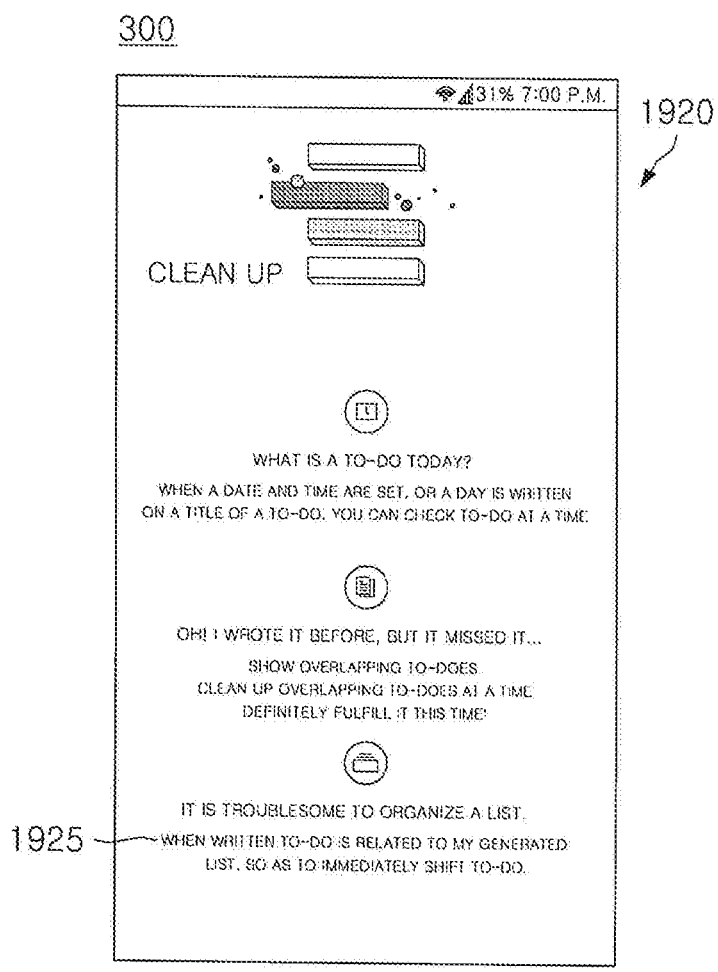

FIGS. 19A to 19C are diagrams referred for describing an operation of the mobile terminal 300 which provides a guidance message related to the to-do clean-up function.

Referring to FIGS. 19A to 19C, the mobile terminal 300 may display an execution screen (that is, a first UI 1910) of the to-do application on the display unit 320 according to a user command. When the corresponding application is first executed, there is no item registered in the to-do list, so that the mobile terminal 300 may display the UI 1910 illustrated in FIG. 19A.

When a clean-up icon 1915 displayed at an upper end of the first UI 1910 is selected, the mobile terminal 300 may display a second UI 1920 including guidance information related to the "to-do clean-up function" on the display unit 320.

The second UI 1920 may include first guidance information 1921 related to a "to-do today", second guidance information 1923 related to an "overlapping to-do", third guidance information 1925 related to a "to-do shiftable to my-list", and the like. Through the guidance information 1921, 1923, and 1925, the terminal user may re-recognize the "to-do clean-up function" provided by the mobile terminal 300.

When the guidance information 1921, 1923, and 1925 is not all displayed on one screen, the second UI 1920 may be configured to be scrolled according to a touch and drag input (not illustrated) or a flicking input 1930 of the terminal user, and the like.

Figure 20A:
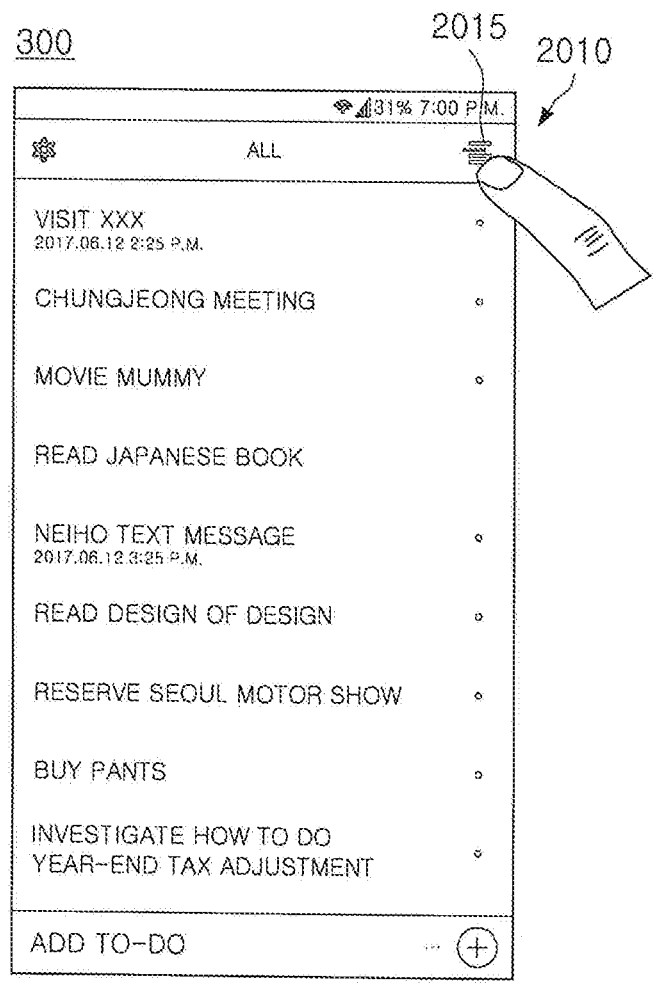
FIGS. 20A to 20C are diagrams referred fore describing an operation of the mobile terminal which provides a first to-do clean-up function.
Figure 20B:
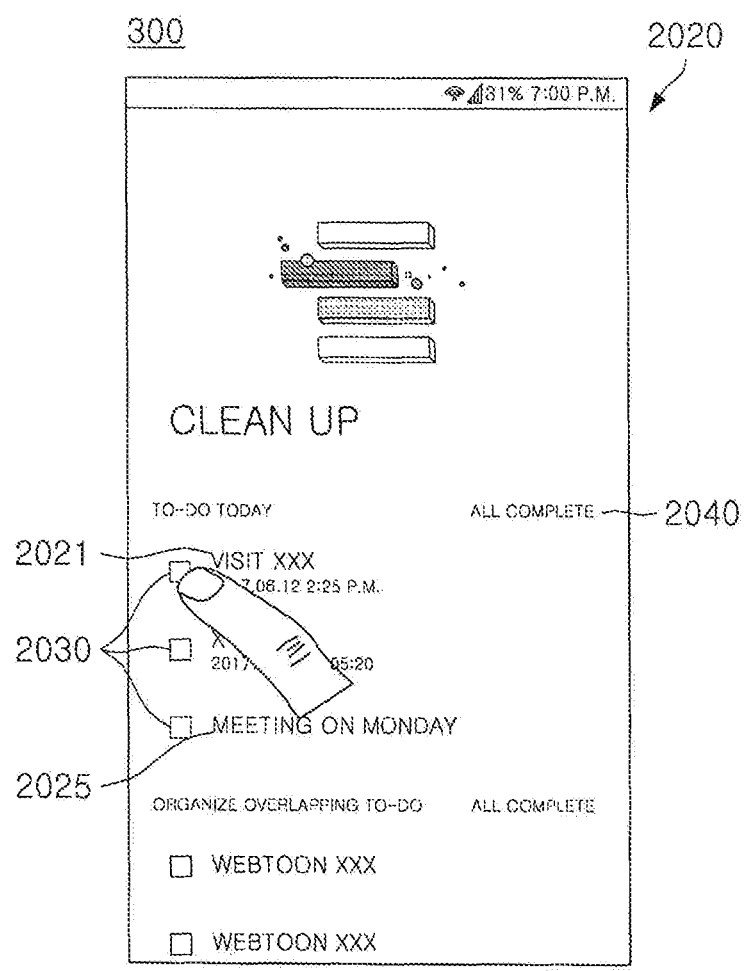
Figure 20C:
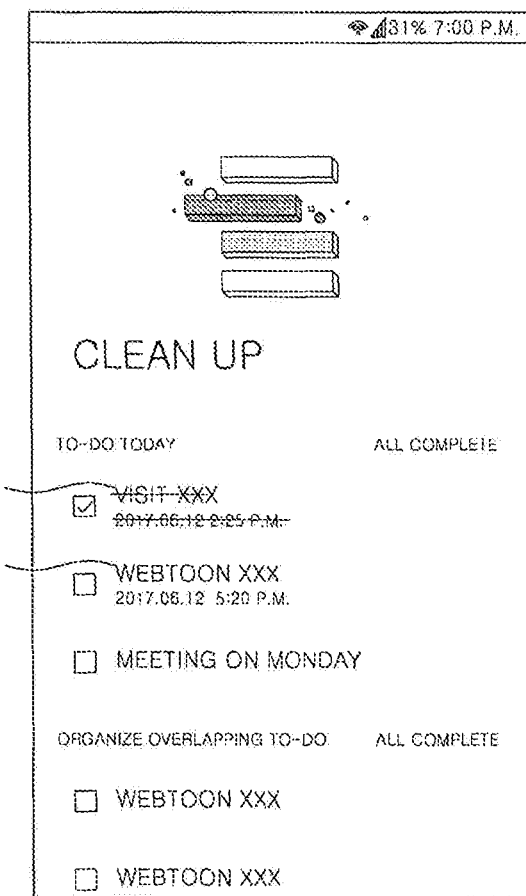

FIGS. 20A to 20C are diagrams referred for describing an operation of the mobile terminal 300 that provides a first to-do clean-up function.

Referring to FIGS. 20A to 20C, the mobile terminal 300 may display an execution screen (that is, a first UI 2010) of the to-do application on the display unit 320 according to a user command. In this case, it is assumed that a to-do list displayed in the first UI 2010 includes one or more items related to a "to-do today".

When a clean-up icon 2015 displayed at an upper end of the first UI 2010 is selected, the mobile terminal 300 may search for organizable items related to the "to-do today" in the plurality of items registered in the to-do list. In this case, the mobile terminal 300 may search for the organizable items by analyzing time information set in the items registered in the to-do list, day/date information included in text information of each item, and the like.

The mobile terminal 300 may display a second UI 2020 for collecting and displaying the searched organizable items 2021, 2023, and 2025 on one screen on the display unit 320.

The mobile terminal 300 may display a check box icon 2030 for individually selecting the item to be organized in an adjacent region of each item. Further, the mobile terminal 300 may display an "all complete menu item 2040" for collectively selecting the items to be organized for each category in the second UI 2020.

When one or more items 2021 are selected through the cheek box icon 2030, the mobile terminal 300 may organize (or delete) the selected item 2021 from the to-do list. In this case, the mobile terminal 300 may display an indicator 2050 (a strikethrough) indicating that the selected item 2021 is deleted from the to-do list on the corresponding item.

Although not illustrated in the drawing, when the "all complete menu item 2040" is selected, the mobile terminal 300 may organize (or delete) all of the items 2021, 2023, and 2025 related to the "to-do today" from the to-do list. In this case, the mobile terminal 300 may display an indicator 2050 (a strikethrough) indicating that the selected items 2021, 2023, and 2025 are deleted from the to-do list on each item.

As another exemplary embodiment, without a need for displaying the cheek box icon, the mobile terminal 300 may be configured so that the corresponding item is deleted from the to-do list in response to a user input of touching the item to be organized among the items displayed in the second UI and dragging the touched item in a direction of a boundary of the display unit 320.

Figure 21A:
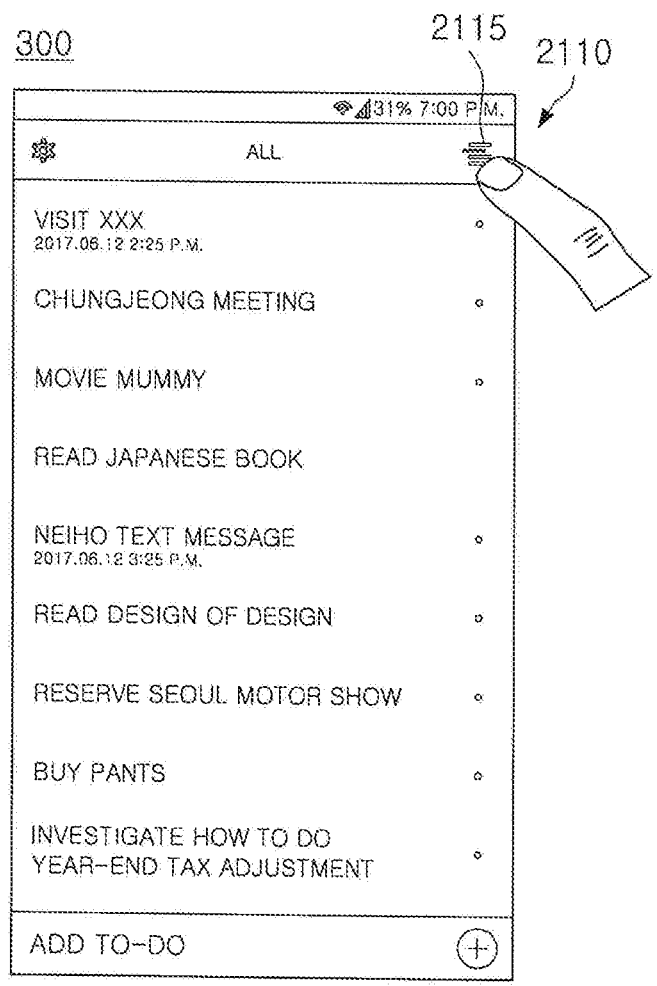
FIGS. 21A to 21C are diagrams referred for describing an operation of the mobile terminal which provides a second to-do clean-up function.
Figure 21B:
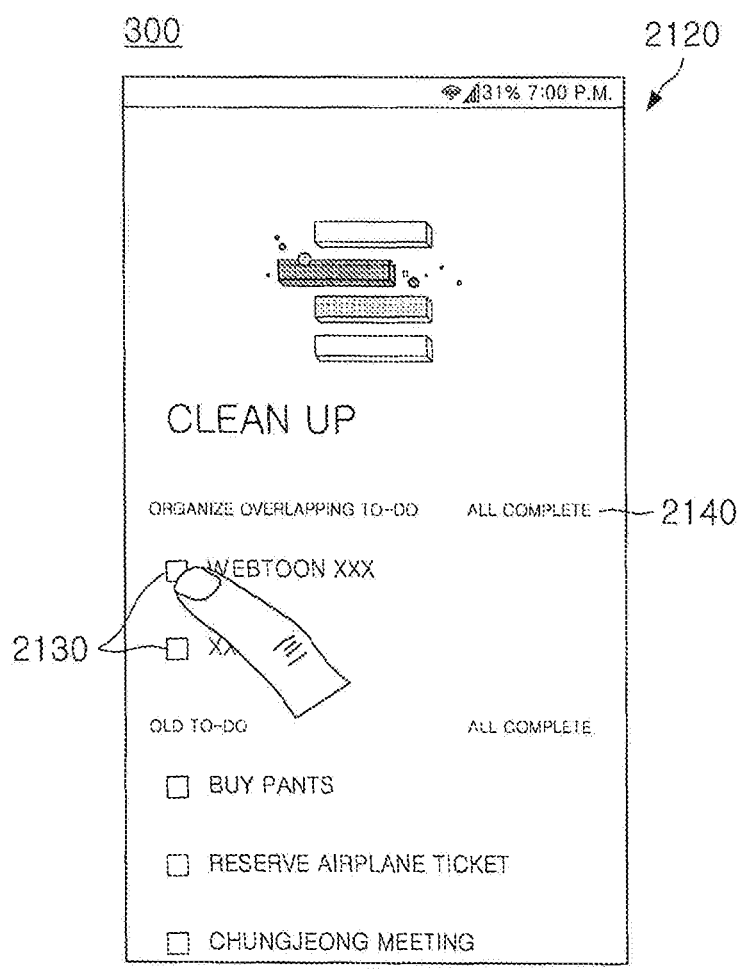
Figure 21C:
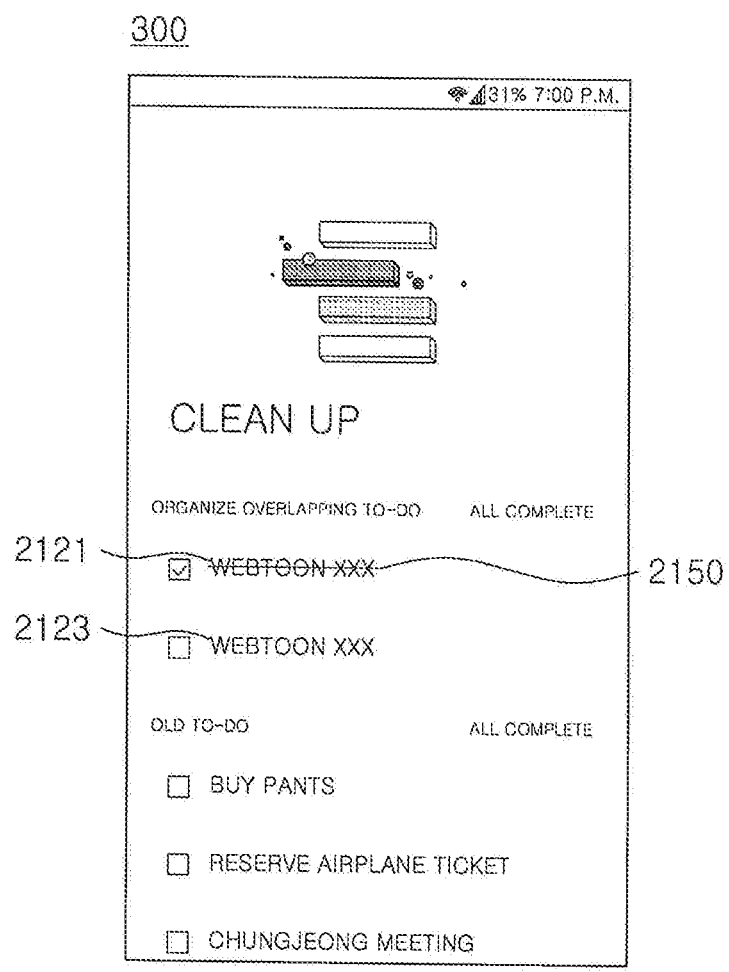

FIGS. 21A to 21C are diagrams referred for describing an operation of the mobile terminal 300 which provides a second to-do clean-up function.

Referring to FIGS. 21A to 21C, the mobile terminal 300 may display an execution screen (that is, a first UI 2110) of the to-do application on the display unit 320 according to a user command. In this case, it is assumed that a to-do list displayed in the first UI 2110 includes the plurality of items related to an "overlapping to-do".

When a clean-up icon 2115 displayed at an upper end of the first UI 2110 is selected, the mobile terminal 300 may search for organizable items related to the "overlapping to-do" in the plurality of items registered in the to-do list. In this case, the mobile terminal 300 may search for the organizable items by extracting main keywords from text information of the items registered in the to-do list, and determining similarity between the extracted main keywords.

The mobile terminal 300 may display a second UI 2120 for collecting and displaying the searched organizable items 2121 and 2123 on one screen on the display unit 320.

The mobile terminal 300 may display a check box icon 2130 for individually selecting the item to be organized in an adjacent region of each item. Further, the mobile terminal 300 may display an "all complete menu item 2140" for collectively selecting the items to be organized for each category in the second UI 2120.

When one or more items 2121 are selected through the check box icon 2130, the mobile terminal 300 may organize (or delete) the selected item 2121 from the to-do list. In this case, the mobile terminal 300 may display an indicator 2150 (a strikethrough) indicating that the selected item 2121 is deleted from the to-do list on the corresponding item.

Figure 22A:
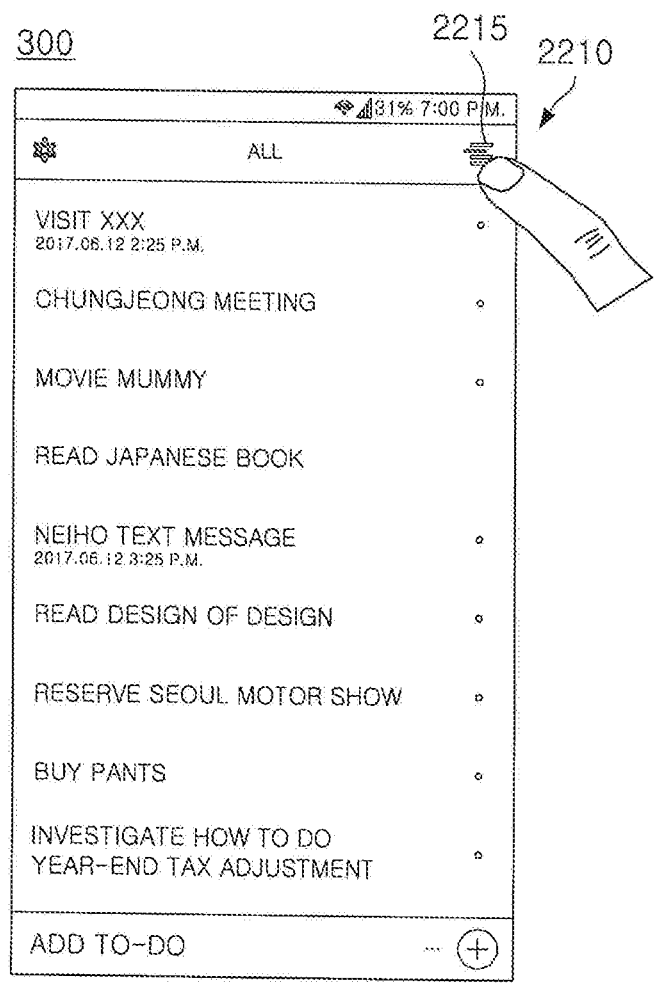
FIGS. 22A to 22C are diagrams referred for describing an operation of the mobile terminal which provides a third to-do clean-up function.
Figure 22B:
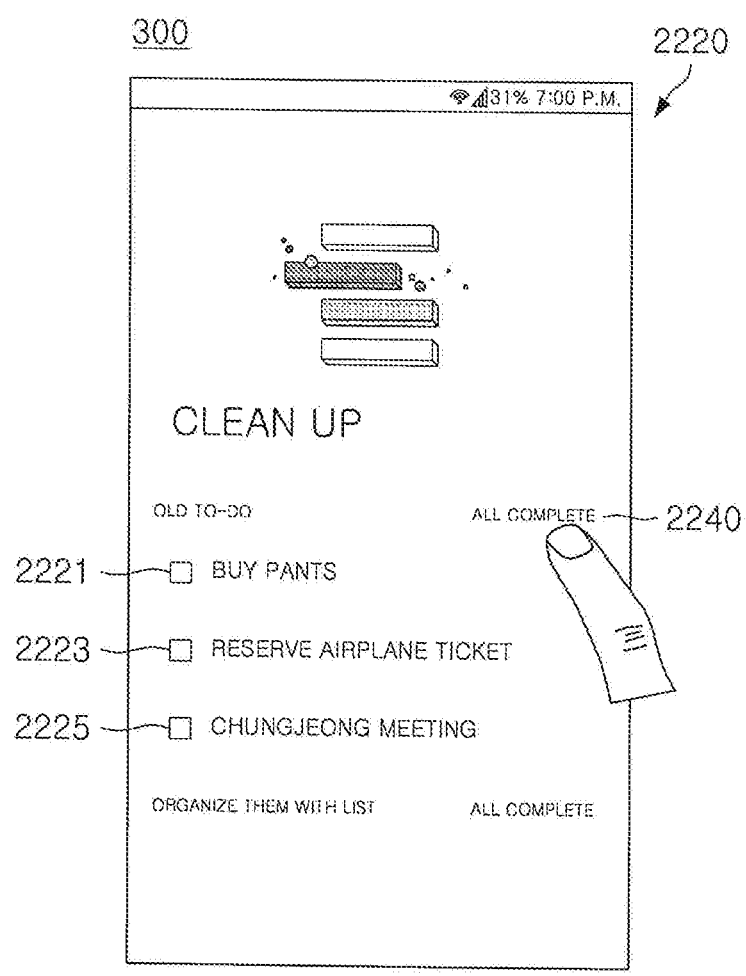
Figure 22C:
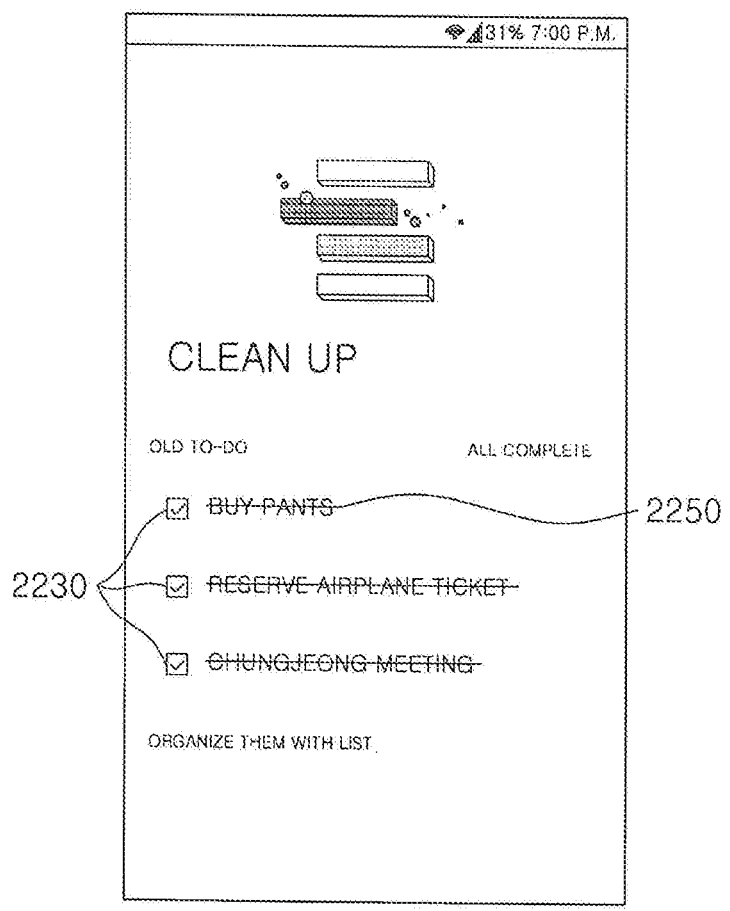

FIGS. 22A to 22C are diagrams referred for describing an operation of the mobile terminal 300 which provides a third to-do clean-up function.

Referring to FIGS. 22A to 22C, the mobile terminal 300 may display an execution screen (that is, a first UI 2210) of the to-do application on the display unit 320 according to a user command. In this case, it is assumed that a to-do list displayed in the first UI 2210 includes one or more items related to an "old to-do".

When a clean-up icon 2215 displayed at an upper end of the first UI 2210 is selected, the mobile terminal 300 may search for organizable items related to the "old to-do" in the plurality of items registered in the to-do list. In this case, the mobile terminal 300 may search for the organizable items by analyzing time information set in the items registered in the to-do list, information on time at which the items included in the to-do list are first registered, text information of each item, and the like.

The mobile terminal 300 may display a second UI 2220 for collecting and displaying the searched organizable items 2221, 2223, and 2225 on one screen on the display unit 320.

The mobile terminal 300 may display a check box icon 2230 for individually selecting the item to be organized in an adjacent region of each item. Further, the mobile terminal 300 may display an "all complete menu item 2240" for collectively selecting the items to be organized for each category in the second UI 2220.

When the "all complete menu item 2240" is selected, the mobile terminal 300 may organize (or delete) all of the items 2221, 2223, and 2225 related to the "old to-do" from the to-do list. In this case, the mobile terminal 300 may display an indicator 2250 (a strikethrough) indicating that the selected items 2221, 2223, and 2225 are deleted from the to-do list on each item.

FIGS. 23A to 23F are diagrams referred for describing an operation of the mobile terminal 300 which provides a fourth to-do clean-up function.

Referring to FIGS. 23A to 23F, the mobile terminal 300 may display an execution screen (that is, a first UI (not illustrated)) of the to-do application on the display unit 320 according to a user command. In this case, it is assumed that a to-do list displayed in the first UI includes one or more items related to a "my-list".

When the clean-up icon displayed at an upper end of the first UI is selected, the mobile terminal 300 may search for organizable items related to the "my-list" in the plurality of items registered in the to-do list, in this case, the mobile terminal 300 may search for the organizable items by extracting main keywords from text information of the items registered in the to-do list, and determining similarity between the extracted main keywords and category items included in the my-list.

The mobile terminal 300 may display a second UI 2310 for collecting and displaying the searched organizable item 2311 on one screen on the display unit 320.

The mobile terminal 300 may display information 2313 about a category item (for example, meeting) of the my-list to which the corresponding item 2311 is to be shifted, i.e., moved, and a fulfillment icon 2315 for adding the corresponding item 2311 to the my-list in an adjacent region of the corresponding item 2311.

When the "fulfillment icon 2315" is selected, the mobile terminal 300 may display a pop-up window 2320 for inquiring whether to shift the corresponding item 2311 to the category item of the my-list on the display unit 320.

When an "OK menu item 2321" of the pop-up window is selected, the mobile terminal 300 may shift the searched organizable item 2311 to the corresponding category item of the my-list.

The mobile terminal 300 may delete the item 2311 displayed in the second UI 2310 for indicating that the shift of the corresponding item 2311 is completed. Further, the mobile terminal 300 may display a notification message (not illustrated) indicating that the corresponding item 2311 has been shined to the my-list on the display unit 320 for a predetermined time.

In the meantime, the mobile terminal 300 may display a third UI 2330 including the my-list and a smart list on the display unit 320 according to a user command.

Figure 23A:
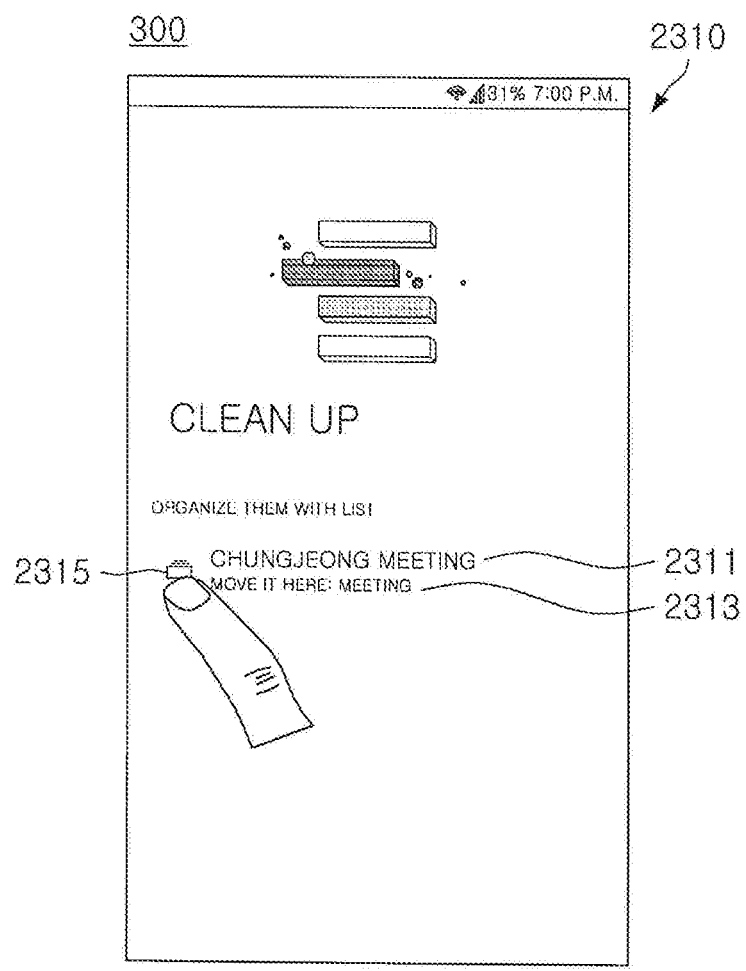
FIGS. 23A to 23F are diagrams referred for describing an operation of the mobile terminal which provides a fourth to-do clean-up function.
Figure 23B:
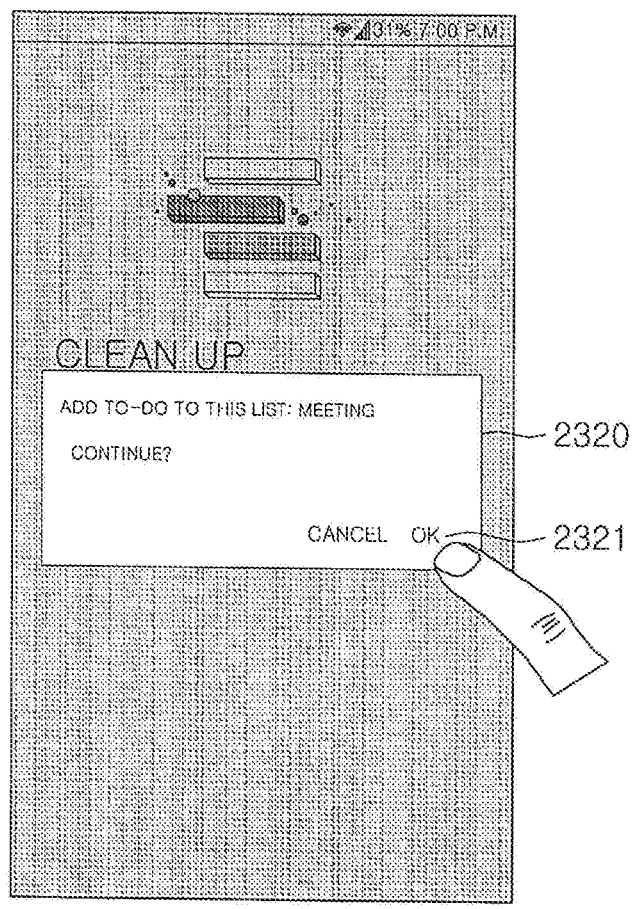
Figure 23C:
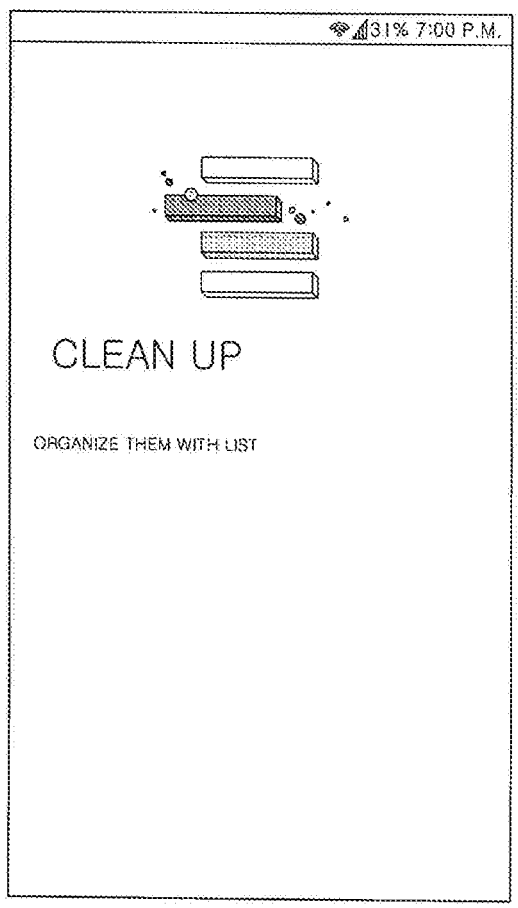
Figure 23D:
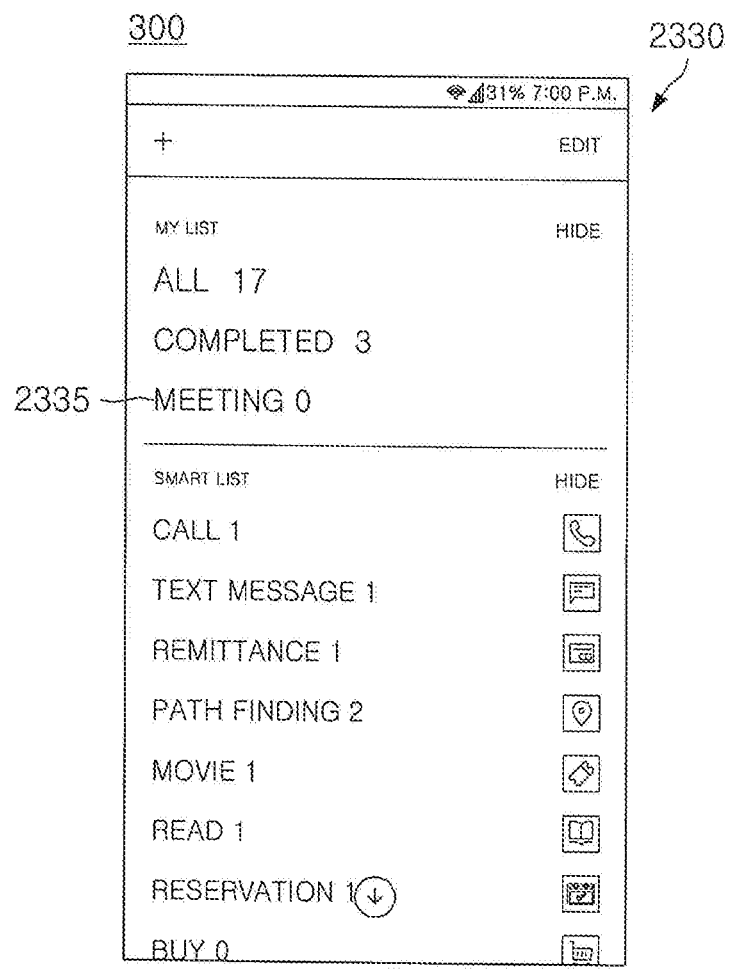
Figure 23E:
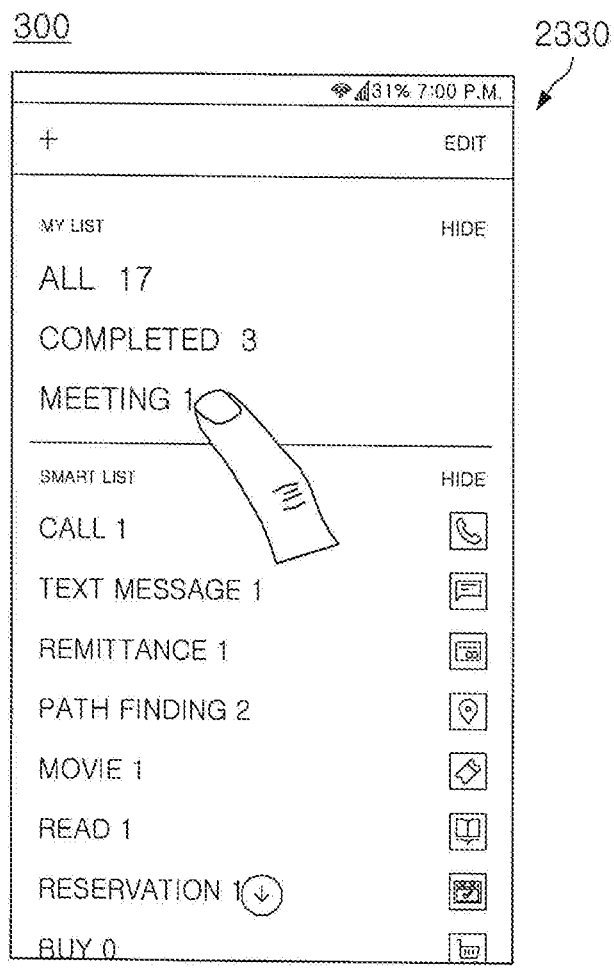
Figure 23F:
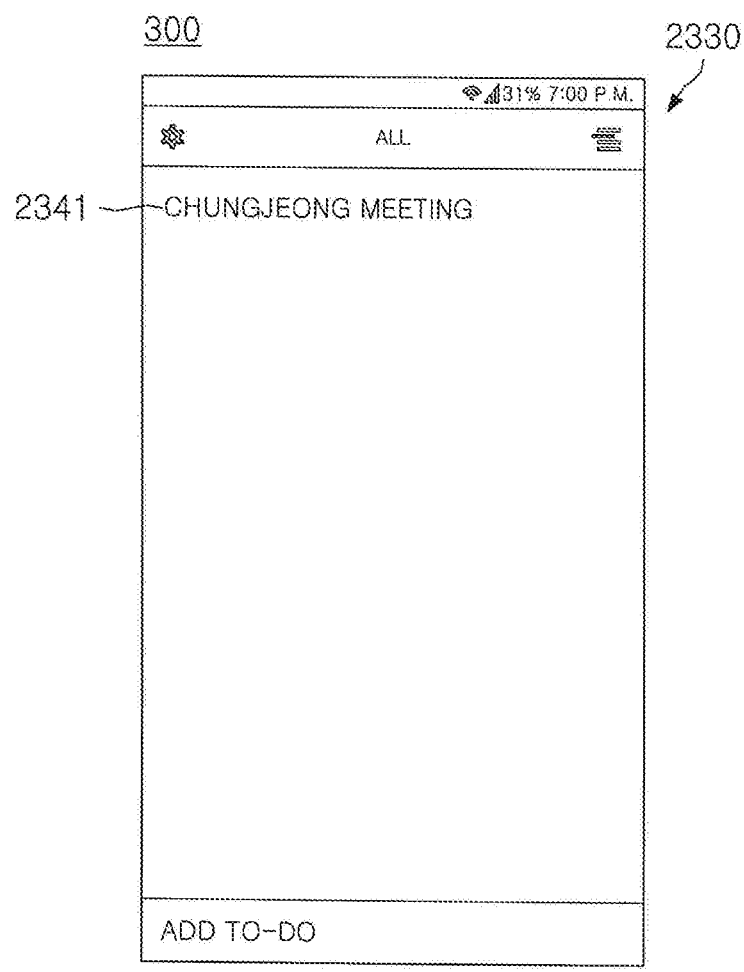

When the shift of the corresponding item 2311 is completed, the mobile terminal 300 may increase the number of to-do items belonging to the meeting category item 2335 displayed in the my-list and display the increased number as illustrated in FIG. 23E.

When the meeting category item 2335 of the my-list is selected, the mobile terminal 300 may display a fourth UI 2340 including a to-do item 2341 belonging to the selected meeting category item 2335 on the display unit 320.

It will be apparent to those skilled in the art, in addition to the "to-do today", the "overlapping to-do", the "old to-do", the "to-do shiftable to my-list", the plurality of items registered in the to-do list may be conveniently organized by setting various categories.

As described above, the mobile terminal according to an exemplary embodiment of the present invention provides the UI for collecting and displaying organizable items among the plurality of items registered in the to-do list on one screen and conveniently organizing the corresponding items, thereby providing user convenience differentiated from that of the mobile terminal in the related art.

The present invention may be implemented as a computer readable code in a medium in which a program is recorded. The computer readable medium may continuously store a computer executable program, or temporarily store a computer executable program for execution or downloading. Further, the medium may be various recording means or storage means in the form in which single or several hardware is combined, and is not limited to a medium directly connected to a specific computer system, but may also be distributed in a network. Examples of the medium may be a medium configured so as to store a program command, including a magnetic medium, such as a hard disk, a floppy disk, and a magnetic tape, an optical-recording medium, such as a compact disk read only memory (CD-ROM) and a digital video disk (DVD), a magneto-optical medium, such as a floptical disk, a read only memory (ROM), a random access memory (RAM), and a flash memory. Further, another example of the medium may be a recording medium or a storage medium managed by an app store distributing applications, or a site and a server supplying or distributing various software, and the like. Accordingly, the detailed description shall not be restrictively construed in all aspects and shall be illustratively considered. The scope of the present invention shall be determined by a rational interpretation of the accompanying claims, and all of the changes are included in the scope of the present invention within an equivalent range of the present invention.

What is claimed is:

1. A method of operating a mobile terminal in communication with a server computer through a network, the method comprising:
    displaying, by a processor, a first user interface (UI) for managing a to-do list of a terminal user on a display unit of the mobile terminal;
    registering, by the processor, a to-do of the terminal user as a to-do item in the to-do list based on user information input through the first UI,
    classifying, by the processor, a plurality of to-do items registered in the to-do list into a predetermined plurality of first categories;
    when at least one of the plurality of to-do items is selected in the first UI, performing, by the processor, an operation related to a task corresponding to the selected to-do item; and
    extracting, by the processor, organizable to-do items within at least one of the predetermined plurality of first categories and displaying the extracted organizable to-do items on a second UI of the display unit, classified according to a predetermined plurality of second categories, different from the first categories, when a clean-up menu item displayed in the first UI is selected.

2. The method of claim 1, wherein the performing the operation related to the task corresponding to the selected to-do item includes executing a function or an app service required for performing the task corresponding to the selected to-do item.

3. The method of claim 1, wherein the performing the operation related to the task corresponding to the selected to-do item includes providing one or more operation option menu items required for performing the task on the display unit.

4. The method of claim 1, wherein the plurality of second categories of the organizable to-do items includes at least one of a "to-do today", an "old to-do", an "overlapping to-do", a "completed to-do", and a "to-do shiftable to my-list".

5. The method of claim 4, further comprising:
when at least one of the organizable to-do items displayed in the second UI is selected, determining a second category to which the selected to-do item belongs.

6. The method of claim 5, further comprising:
organizing the selected organizable to-do item using a predetermined scheme according to a kind of the determined second category.

7. The method of claim 6, wherein when the determined second category is any one of the "to-do today", the "old to-do", the "overlapping to-do", and the "completed to-do", the organizing the selected organizable to-do item includes deleting the selected organizable to-do item from the to-do list.

8. The method of claim 6, wherein when the determined second category is the "to-do shiftable to my-list", the organizing the selected organizable to-do item includes shifting the selected to-do item to a corresponding second category item in a my-list.

9. The method of claim 4, wherein when the second category of the organizable to-do items is the "to-do today", the extracting of the organizable to-do items includes analyzing at least one of time information set in the plurality of to-do items and text information of the plurality of to-do items.

10. The method of claim 4, wherein when the second category of the organizable to-do items is the "old to-do", the extracting of the organizable to-do items includes analyzing at least one of time information set in the plurality of to-do items, information on time at which the plurality of to-do items are first registered, and text information of the plurality of to-do items.

11. The method of claim 4, wherein when the second category of the organizable to-do items is the "overlapping to-do", the extracting of the organizable to-do items includes extracting main keywords from text information corresponding to the plurality of to-do items and extracting the organizable to-do items based on similarity between the extracted main keywords.

12. The method of claim 4, wherein when the second category of the organizable to-do items is the "to-do shiftable to my-list", the extracting of the organizable to-do items includes extracting main keywords from text information corresponding to the plurality of to-do items and extracting the organizable to-do items based on similarity between the extracted main keywords and category items included in a my-list.

13. The method of claim 4, wherein when the second category of the organizable to-do items is the "completed to-do", the extracting of the organizable to-do items is based on at least one of whether mobile services related to the plurality of to-do items are executed and whether the plurality of to-do items are selected.

14. The method of claim 1, wherein the first UI includes at least one of a menu region for displaying operation menu items related to a to-do application, a task list region for displaying the to-do list of the terminal user, and a text input region for registering a new to-do in the to-do list.

15. The method of claim 14, wherein the menu region of the first UI includes at least one of a screen switch icon for displaying a UI including a my-list, the clean-up menu item, and a banner icon for providing at least one of the plurality of to-do items registered in the to-do list in a form of a preview.

16. The method of claim 1, wherein the second UI includes a first indicator for individually selecting the organizable to-do items and a second indicator for collectively selecting the organizable to-do items, together with the organizable to-do items for each second category.

17. The method of claim 1, wherein the extracting of the organizable to-do items includes searching for the organizable to-do items using a predetermined scheme according to a kind of the plurality of second categories.

18. A mobile terminal, comprising:
a display unit;
a wireless communication unit configured to provide a wireless communication interface with a remote server; and
a control unit configured to:
display a first user interface (UI) for managing a to-do list of a terminal user on the display unit,
register a to-do of the terminal user as a to-do item in the to-do list based on user information input through the first UI,
classify a plurality of to-do items registered in the to-do list into a predetermined plurality of first categories,
when at least one of the plurality of to-do items is selected in the first UI, perform an operation related to a task corresponding to the selected to-do item, and
extract organizable to-do items within at least one of the predetermined plurality of first categories and display the organizable extracted to-do items on a second UI of the display unit, classified according to a predetermined plurality of second categories, different from the first categories, when a clean-up menu item displayed in the first UI is selected.

19. A method of operating a server in communication with a mobile terminal through a network, the method comprising:
transmitting, by a processor, information regarding a first user interface (UI) for managing a to-do list of a terminal user to the mobile terminal;
receiving, by the processor, user information input through the first UI from the mobile terminal;
registering, by the processor, a to-do of the terminal user as a to-do item in a to-do list based on the received input information,
classifying, by the processor, a plurality of to-do items registered in the to-do list into a predetermined plurality of first categories;
when at least one of the plurality of to-do items is selected in the first UI, providing, by the processor, a mobile service related to a task corresponding to the selected to-do item to the mobile terminal; and extracting, by the processor, organizable to-do items within at least one of the predetermined plurality of first categories and transmitting information regarding a second UI including the extracted organizable to-do items to the mobile terminal, the extracted to-do items being classified according to a predetermined plurality of second categories, different from the first categories, when a clean-up menu item displayed in the first UI is selected.

* * * * *